United States Patent [19]

Okubo

[11] Patent Number: 5,781,653
[45] Date of Patent: Jul. 14, 1998

[54] IMAGE PROCESSING APPARATUS FOR DETERMINING COPYING-INHIBITED DOCUMENT

[75] Inventor: Hiromi Okubo, Yokohama, Japan

[73] Assignee: Ricoh Company, Limited, Tokyo, Japan

[21] Appl. No.: 522,436

[22] Filed: Aug. 31, 1995

[30] Foreign Application Priority Data

| Aug. 31, 1994 | [JP] | Japan | 6-207761 |
| Oct. 19, 1994 | [JP] | Japan | 6-253859 |
| Oct. 19, 1994 | [JP] | Japan | 6-253860 |
| Aug. 9, 1995 | [JP] | Japan | 7-203700 |

[51] Int. Cl.[6] .................................................. G06K 9/46
[52] U.S. Cl. ........................ 382/135; 382/195; 382/274; 399/366; 283/72
[58] Field of Search .......................... 382/100, 317, 382/135, 190, 195, 274; 358/501; 399/366; 355/133; 283/902, 93, 72

[56] References Cited

U.S. PATENT DOCUMENTS

| 5,309,245 | 5/1994 | Hayashi et al. | 358/296 |
| 5,363,454 | 11/1994 | Udagawa et al. | 382/135 |
| 5,426,710 | 6/1995 | Suzuki et al. | 382/135 |
| 5,483,602 | 1/1996 | Stenzel et al. | 382/135 |
| 5,583,614 | 12/1996 | Hasuo et al. | 283/902 |

FOREIGN PATENT DOCUMENTS 4-54681  2/1992  Japan.

Primary Examiner—Yon J. Couso
Assistant Examiner—Jon Chang
Attorney, Agent, or Firm—McDermott, Will & Emery

[57] ABSTRACT

There is provided by the present invention an image processing apparatus which accurately determines a copying-inhibited document prepared by using paper with a copying-inhibited pattern printed or copied on the entire surface thereof by checking for each pixel data constituting image data whether an object pixel has a black peak density coincident to that of a copying-inhibited document, whether a white area having a specified size exists at a peripheral area at a distance therefrom, whether the object pixel is a screen tone graph or character area pixel, or an illegal area pixel or not.

20 Claims, 26 Drawing Sheets

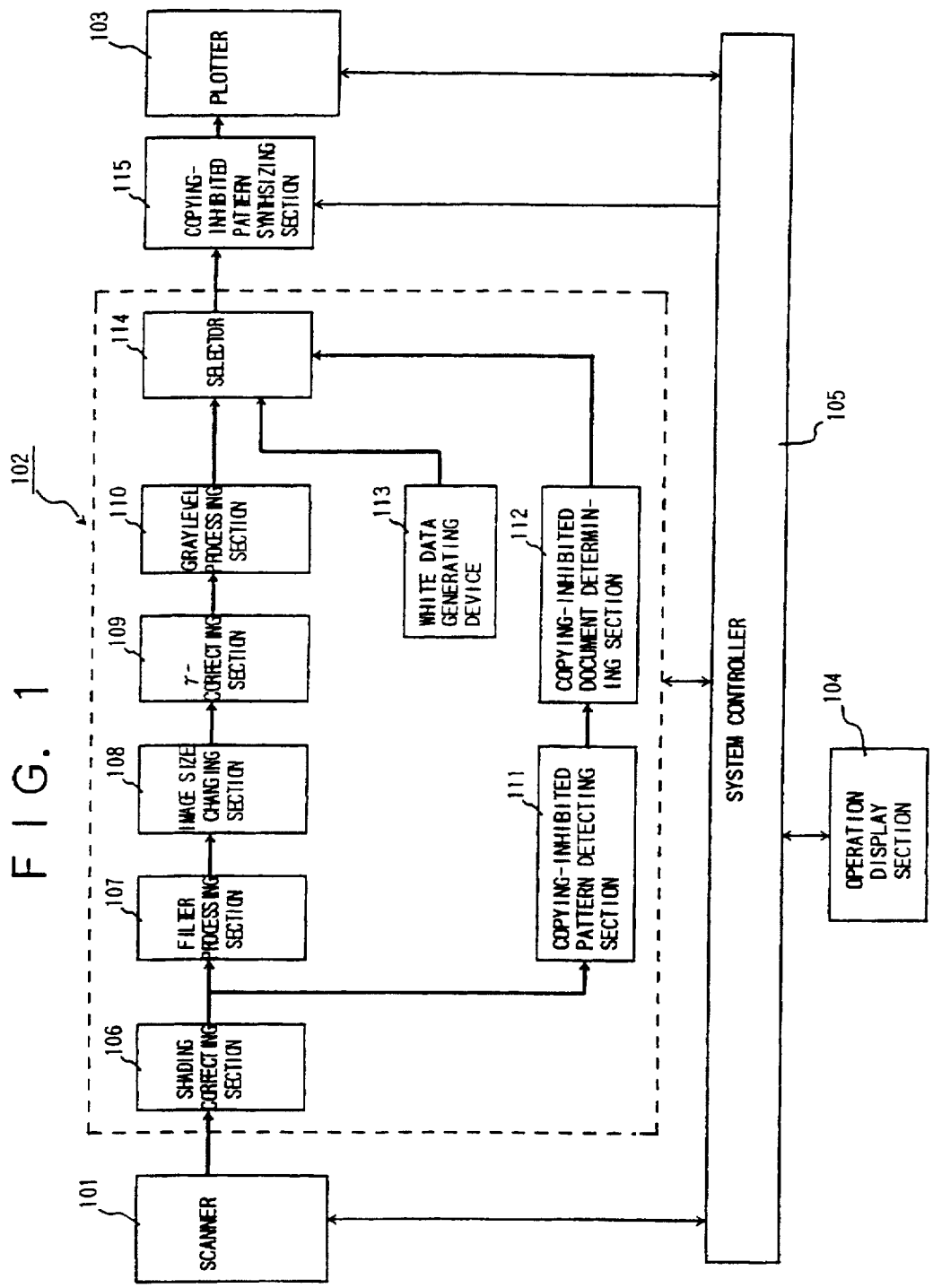

FIG. 4

| A | B | C |
|---|---|---|
| D | E | F |
| G | H | I |

F I G. 6
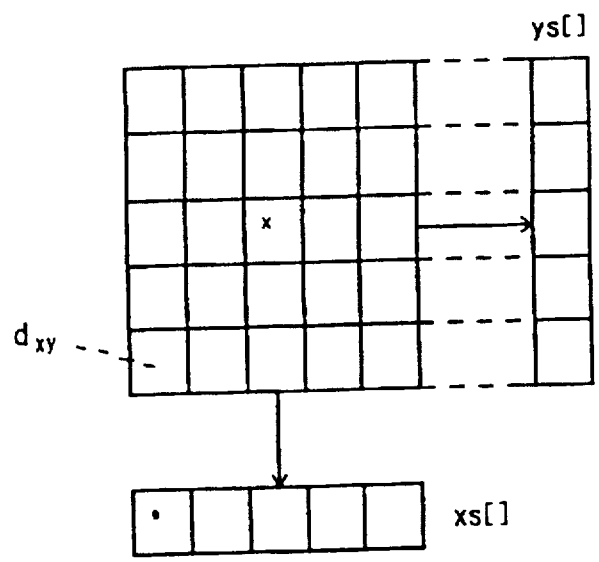
F I G. 7
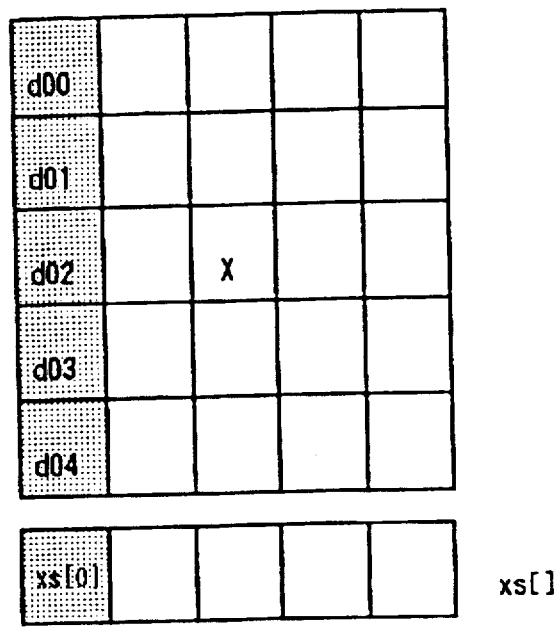

F I G. 8
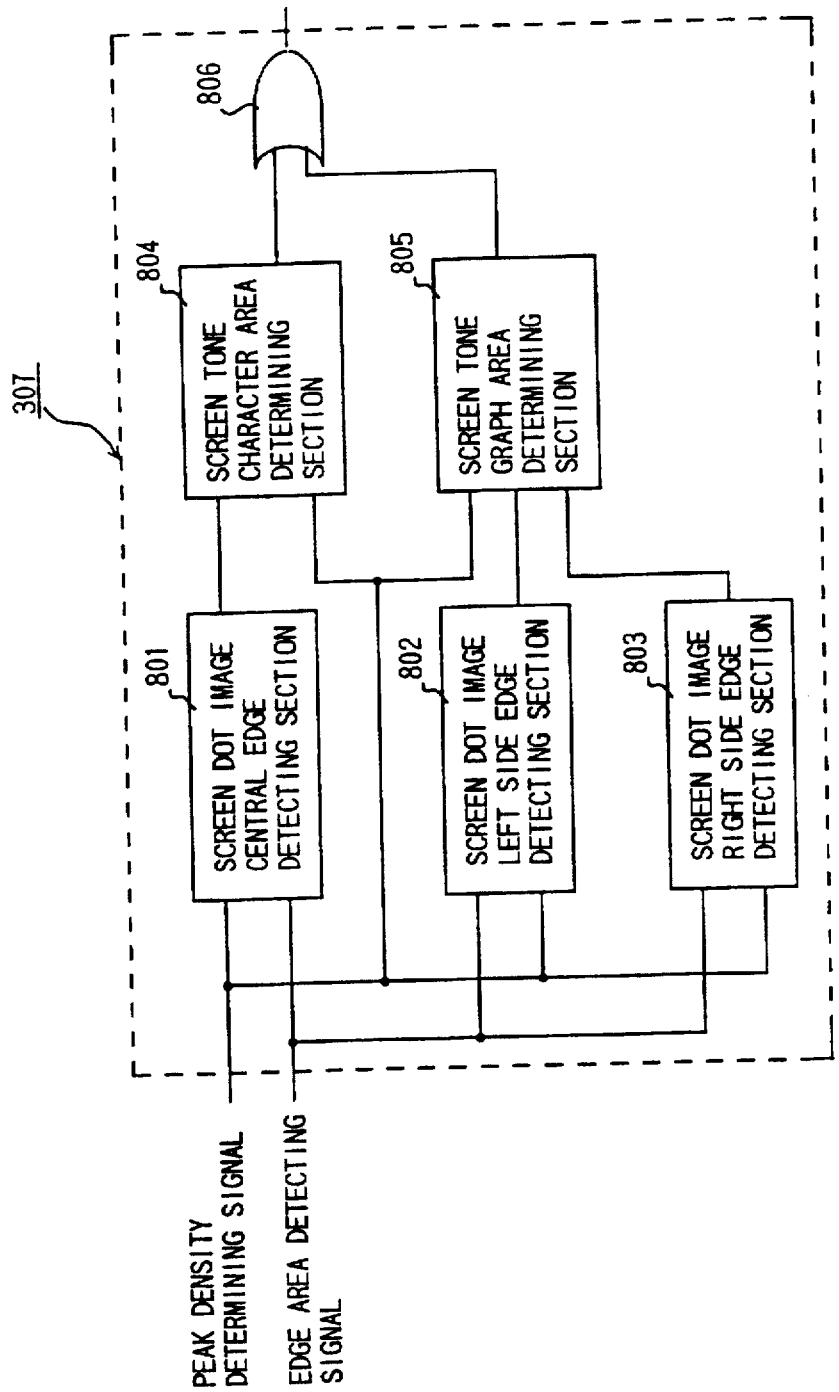

F I G. 1 1
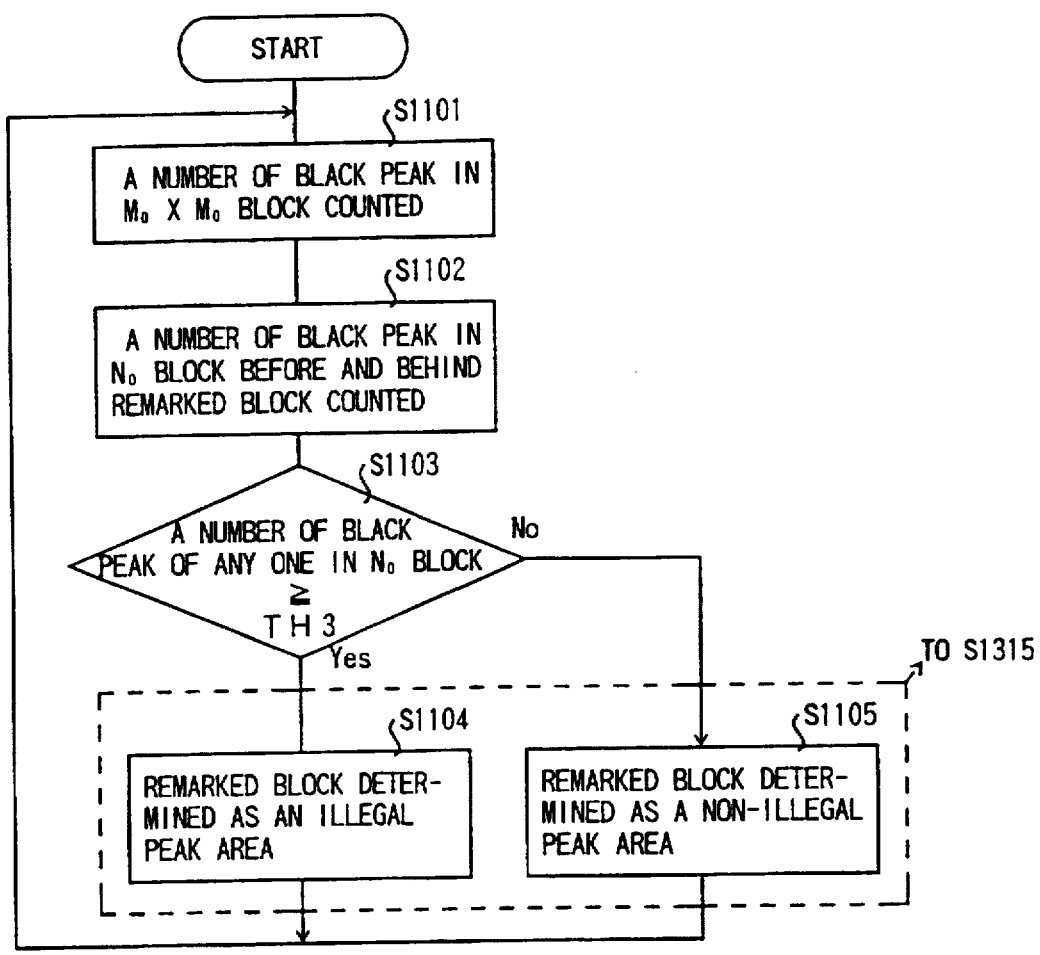

FIG. 20

| A | B | C |
|---|---|---|
|   |   |   |
| D | E | F |
|   |   |   |
| G | H | I |

IMAGE PROCESSING APPARATUS FOR DETERMINING COPYING-INHIBITED DOCUMENT

FIELD OF THE INVENTION

The present invention relates to an image processing apparatus used in a digital copier, a facsimile machine, a scanner, an image filing device or the like, and more particularly to an image processing apparatus having a function to prevent copying-inhibited documents from being illegally copied.

BACKGROUND OF THE INVENTION

In recent years, in association with improvement in the field of image processing technology and image forming technology, it has become possible to make so exquisite copies that, for instance, a copied bill copied by a digital color copier can not easily be distinguished from an actual one. For this reason, there has been put into practical use a digital color copier which can identify specific documents inhibited to be copied such as bills or securities and prevent the specific documents from being illegally copied.

As a method of identifying specific documents such as bills or securities, there have been proposed a method in which inputted image data is compared to particular marks (pattern data) previously registered by means of pattern matching method and it is determined that, if there exists any particular mark, the document is identified as a specific one, a method in which a form of histogram based on color phase distribution is checked to determine whether a document is a specific one or not as disclosed in Japanese Patent Laid-Open No. 54681/1992.

On the other hand, in offices of business organization or the like, in addition to the specific documents such as bills and securities, there are various types of documents, copying of which is inhibited because of importance of contents of the document, or from the viewpoint of data security (described as copying-inhibited document hereinafter). Generally a stamp indicating the necessity of security, or a mark indicating inhibition of copying is put on the copying-inhibited documents as described above to differentiate the documents from ordinary documents which may be copied.

However in the conventional technology, as stamp indicating the necessity of security or a mark indicating inhibition of copying is put on a copying-inhibited document so that a user can recognize it as a copying-inhibited one and follows inhibition for the purpose to prevent a copying-inhibited document from being illegally copied, actually it can not prevent a copying-inhibited document from being copied, and for instance a user can copy any document using a copier, send a copying-inhibited document through a facsimile machine, and furthermore can input an image of a copying-inhibited document into an image filing device for storing it therein.

It is conceivable to apply the methods of identifying specific documents as described above to determination of a copying-inhibited document and build an apparatus for inhibiting copying of copying-inhibited documents, but in a case where copying of a copying-inhibited document is inhibited by identifying a stamp indicating the necessity of security or a mark indicating inhibition of copying by means of pattern matching method, if a portion of the stamp or the mark is covered with paper or the like when copied, determination can not be made, and it is impossible to inhibit copying of copying-inhibited documents.

Also in a case when determination is carried out by comparing a form of histogram based on color phase distribution, it is impossible to apply the method to a device which treats image data as white/black two-valued data, and moreover there are various types of copying-inhibited document, and there is not always a common aspect among the forms of histogram based on color phase distribution, and for this reason sometimes determination of a copying-inhibited document itself can not be executed smoothly.

SUMMARY OF THE INVENTION

It is an object of the present invention to accurately inhibit copying, transfer, storage, and input of image data of any copying-inhibited document without fail by accurately executing determination of copying-inhibited documents.

As described above, the image processing apparatus according to the present invention has a black peak detecting means for checking, object pixel data and pixel data adjoining it, as to whether the object pixel is a black peak or not for each pixel data constituting image data, and receives a result of detection by the black peak detecting means, and makes a determination as to whether a black peak density in an area around object pixel data as a center coincides with a black peak density of the previously decided copying-inhibited pattern or not. Also, a white area is detected by receiving the image data inputted thereto, an edge area is detected by receiving the image data inputted thereto, and whether a white area having a specified size exists or not within a peripheral area at a distance from object pixel data determined as a pixel coincident to a black peak density of the copying-inhibit ed pattern is checked, also whether object pixel data determined as a pixel coincident to a black peak density of the copying-inhibited pattern is a screen tone graph or a screen tone character area pixel or not is checked, and furthermore determination is made as to whether remarked pixel data determined as a pixel coincident to a black peak density of the copying-inhibited pattern is an illegal peak area pixel or not. Then, determination is made as to whether the image data is a copying-inhibited document or not according to whether an object pixel is a pixel coincident to a black peak density of the copy-inhibited pattern or not, whether a white area having a specified size exists within a peripheral area at a distance or not, whether an object pixel is a screen tone graph or a screen tone character area pixel or not, and whether an object pixel is an illegal peak area pixel or not, so that a copying-inhibited document prepared by previously printing or copying a copying-inhibited pattern on entire paper can accurately be differentiated, and copying, transfer, storage, input of image data of a copying-inhibited document can accurately be prohibited.

In the illegal peak area determining means, determination is made as to whether or not the object pixel data determined as pixels coincident to a black peak density of the copying-inhibited pattern is an illegal peak area pixel caused by background dirt or the like, and in the object pixel data determining means, an illegal peak area pixel is determined that it is not a portion of the copying-inhibited pattern, so that a copy of document printed by screen tone points and background dirt can be avoided recognizing as a copying-inhibited pattern.

Other objects and features of this invention will become understood from the following description with reference to the accompanying drawings.

BRIEF DESCRIPTION OF THE DRAWINGS

FIG. 1 is a block diagram of a digital copying machine according to the present embodiment;

FIG. 4 is an explanatory view showing an example of a black peak detecting method in the black peak detecting section;

FIG. 6 is a simulated view of determination of an edge pixel in the present embodiment;

FIG. 7 is a simulated view of determination of an edge pixel in the present embodiment;

FIG. 8 is an explanatory view showing configuration of a screen tone graph/a screen tone character area determining section;

FIG. 11 is a flow chart showing operations for determining in the illegal peak area determining section;

FIG. 20 is an explanatory view showing 3×5 matrix used in the black peak detecting section in Embodiment 3;

DETAILED DESCRIPTION OF THE PREFERRED EMBODIMENTS

|EMBODIMENT 1|

Figure 2A:
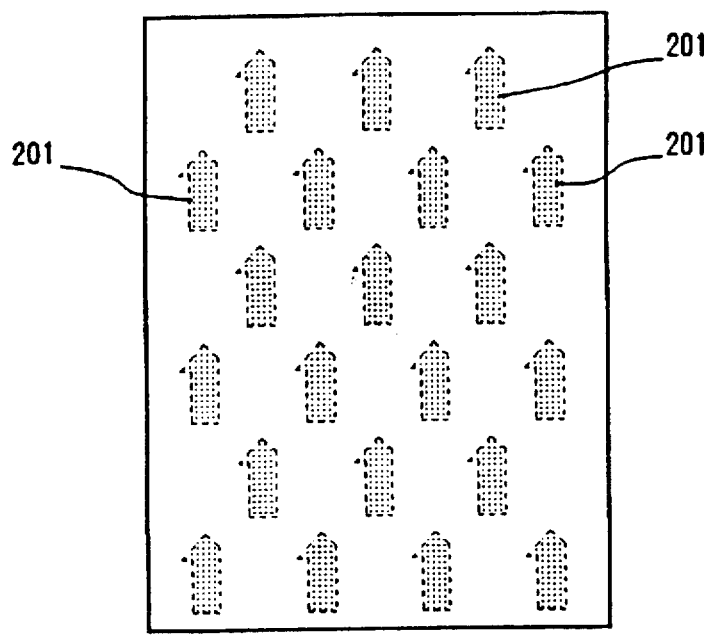
FIGS. 2A and 2B are explanatory views showing a copying-inhibited pattern.

Detailed description is made hereinafter for a case where an image processing apparatus according to the present invention is applied to a digital copier with reference to related drawings. Description for a digital copier according to the present embodiment is made in the following order:

1: General configuration of a digital copier

2: Copying-inhibited patterns

3: Copying-inhibited pattern detecting section

4: Copying-inhibited document determining section

5: Operations for determination of copying-inhibited documents

6: Operation for forming a copying-inhibited pattern (1) General configuration of a digital copier FIG. 1 is a bock diagram showing a digital copier according to the present invention comprising a scanner 101 for reading an image from a document and outputting image data subjected to A/D conversion (analog to digital conversion), an image processing section 102 for receiving image data inputted from the scanner 101 and executing various types of image processing as described below and a processing for determining copying-inhibited documents according to the present invention, a plotter 103 for outputting image data subjected to image processing in the image processing section 102 to recording paper, a copying-inhibited pattern synthesizing section 115 provided between the image processing section 102 and the plotter 103 for synthesizing a copying-inhibited pattern to the image data outputted from the image processing section 102, an operation display section 104 for inputting various types of operation mode and displaying messages, and a system controller 105 for controlling each of the sections described above. It should be noted that a security pattern printing function in a digital copier, which is a well-known technology, can be used as the copying-inhibited pattern synthesizing section 115, and detailed description thereof is omitted herein.

Furthermore the image processing section 102 comprises a shading correcting section 106 for executing shading correction to image data inputted from the scanner 101, a filter processing section 107 for executing various types of filter processing to the inputted image data using a smoothing filter, an edge emphasizing filter or the like, an image size changing section 108 for changing size of image data, a γ-correcting section 109 for executing γ-correction, a gray level processing section 110 for converting image data to preset multi-valued data, a copying-inhibited pattern detecting section 111 for receiving image data inputted from the scanner 101 and checking whether each of individual pixel data constituting the image data is a portion of any preset copying-inhibited pattern or not, a copying-inhibited document determining section 112 for checking whether image data is a copying-inhibited document or not according to a

5 number of pixel data detected as a portion of a copying-inhibited pattern by the copying-inhibited pattern detecting section 111, a white data generating device 113 for generating image data consisting of white data, and a selector 114 for receiving image data from both the gray level processing section 110 and the white data generating device 113 and selectively outputting either image data inputted from the gray level processing section 110 or image data (white data) inputted from the white data generating device 113 via the copying-inhibited pattern synthesizing section 115 to the plotter 103 according to a result of determination by the copying-inhibited document determining section 112.

(2) Copying-inhibited pattern

Figure 2B:
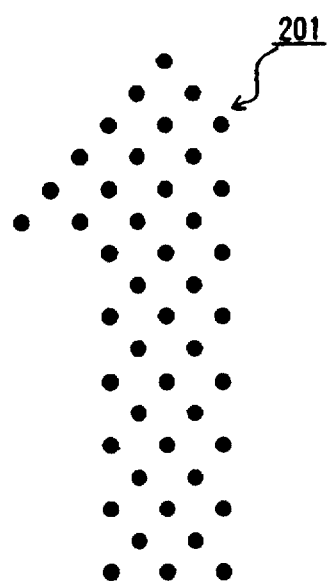

Next description is made for a copying-inhibited pattern with reference to FIG. 2. A copying-inhibited pattern is a pattern used to determine whether image data (namely a document) is a copying-inhibited document or not, and in the present invention a document with a copying-inhibited pattern formed thereof is regarded as a copying-inhibited document. For this reason a copying-inhibited document is prepared by using paper with a copying-inhibited pattern printed or copied on the entire surface thereof. For instances as shown in FIG. 2A, a copying-inhibited document is prepared by recording a security document on paper with a copying-inhibited pattern 201 formed on the entire surface thereof. Also, when an original draft of a document, copying of which is inhibited, is copied, it is possible to prepare a copying-inhibited document by synthesizing a copying-inhibited pattern to a document to be copied by using the copying-inhibited pattern synthesizing section 115. It should be noted that synthesization of a copying-inhibited pattern with the copying-inhibited pattern synthesizing section 115 is specified by pressing a specified key (not shown) on the operation display section 104, and when a specified key is pressed down, the copying-inhibited pattern synthesizing section 115 synthesizes a copying-inhibited pattern on image data sent via the selector 114 under control by the system controller 105, and outputs the synthesized pattern to the plotter 103. The copying-inhibited pattern 201 synthesized by the copying-inhibited pattern synthesizing section 115 is a figure (herein 1) comprising around 65 dot lines as shown in the expanded view in FIGS. 2A and 2B. As shown in FIG. 2A, a document with the copying-inhibited pattern 201 recorded on the entire surface is determined as a copying-inhibited document by an apparatus according to the present invention described in detail later and operation for inhibition of copying is executed. Ordinary copying operation is executed to other documents.

(3) Copying-inhibited pattern detecting section

Figure 3:
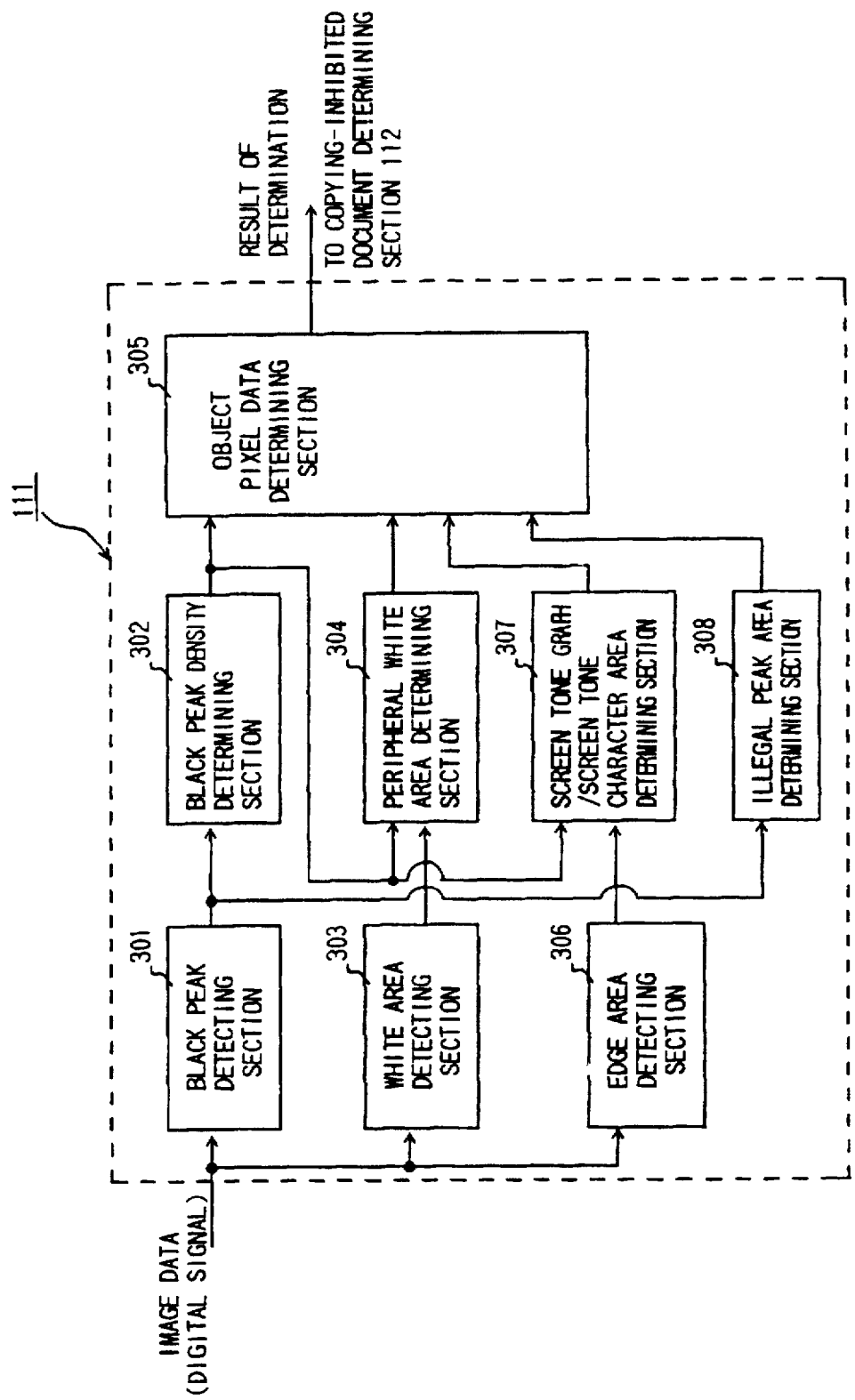
FIG. 3 is a block diagram of a copying-inhibited pattern detecting section according to the present embodiment.

FIG. 3 is a block diagram illustrating the copying-inhibited pattern detecting section 111 comprising a black peak detecting section 301 for checking depending on object pixel data and adjoining pixel data for each individual pixel data constituting image data whether the object pixel is a black peak or not, a black peak density determining section 302 for receiving a result of detection by the black peak detecting section 301 and checking whether a black peak density within a certain area around object pixel data as a center is coincident to a prespecified black peak density of a copying-inhibited pattern or not, a white area detecting section 303 for receiving image data inputted thereto and detecting a white area, an edge area detecting section 306 for receiving image data inputted thereto and detecting an edge area, a peripheral white area determining section 304 for receiving a result of detection by the black peak density determining section 302 and a result of detection by the white area detecting section 303 and making a determination

6 as to whether a white area having a specified size exists or not at a peripheral area at a distance away from object pixel data determined as a pixel coincident to a black peak density of a copying-inhibited pattern, a screen tone graph/screen tone character area determining section 307 for receiving a result of determination by the black peak density determining section 302 and a result of detection by the edge area detecting section 306 and making a determination as to whether object pixel data determined as a pixel coincident to a black peak density of a copying-inhibited pattern is a screen tone graph or screen tone character area pixel or not, an illegal peak area determining section 308 for receiving a result of determination by the black peak detecting section 301 and making a determination as to whether the object pixel data determined as a pixel coincident to a black peak density of a copying-inhibited pattern is an illegal peak area pixel or not, and an object pixel data determining section 305 for making a determination as to whether the object pixel data is a portion of a copying-inhibited pattern or not according to a result of determination by the black peak density determining section 302, a result of determination by the peripheral white area determining section 304, a result of determination by the screen tone graph/screen tone character area determining section 307, and a result of determination by the illegal peak area determining section 308.

Figure 4:
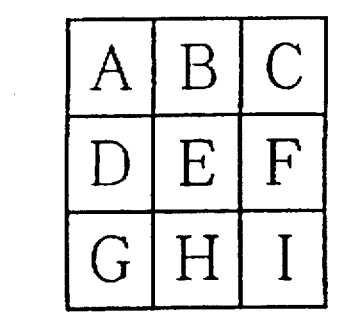

Concretely, the black peak detecting section 301 described above regards object pixel data in a 3×3 matrix as shown in FIG. 4 as a central pixel E and detects the object pixel data as a black peak pixel when a density of the central pixel E is higher than other pixels and at the same time a density of the central pixel E is higher than a prespecified threshold value (described as a black peak threshold value).

Also the black peak density determining section 302 measures a black peak density within a certain area around the object pixel data as a center (for instance 11×11 matrix), and determines whether the measured black peak is equal to a peak density of around 65 screen dot lines specific to the copying-inhibited pattern 201 shown in FIG. 2.

Similarly, the white area detecting section 303 checks for a white area within a certain area and determines whether a white area exists or not. In this step, detection of a white area is executed by, for instance, converting each pixel in a J×J matrix (for instance, 11×33 matrix) to two-valued data with a prespecified threshold value (called a white area detection threshold value), and area of J×J matrix is detected as a white area when all pixels in the matrix are white.

Figure 5A:
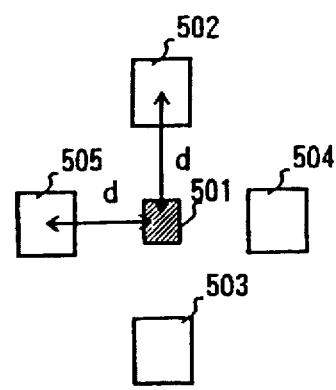
FIGS. 5A and 5B are explanatory views showing a determining method of a white area in a peripheral white area determining section.
Figure 5B:
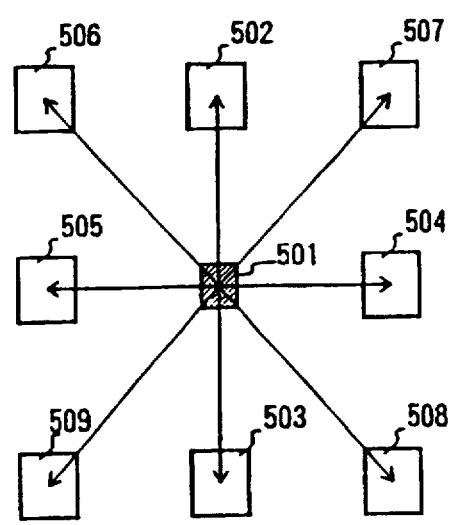

Furthermore, in the peripheral white area determining area 304 a determination is made as to whether or not a white area exists in an area at a distance from a pixel detected as a black peak pixel depending on a result of detection by the white area detecting section 303 as well as a result of detection by the black peak detecting section 301. For instance, if a white area exists in each of areas 502, 503, 504, and 505 each at a distanced in the four directions of up, down, left, and right from the object pixel 501 as shown in FIG. 5A, the object pixel 501 is determined as a pixel having a peripheral white area around it. Herein, whether a white area exists or not is determined by checking the areas 502, 503, 504, and 505 in the four directions of up, down, left and right from the object pixel 501, but 8 areas 502 to 509 in the eight directions of up, down, left, right, diagonally left up, diagonally right up, diagonally right down, and diagonally left down may be checked as shown in FIG. 5B to improve the precision in determination of a peripheral white area. Or, as shown in FIG. 5A, determination may be executed by checking only the areas 502, 503 in the two directions of up and down to reduce a quantity of required hardware for simplifying the configuration.

In the edge area detecting section 306, a determination is made as to whether an object pixel is a pixel in an edge area or not. Although determination of an edge pixel area is executed by checking a K×K pixel reference matrix, the following description of the present embodiment assumes that the reference matrix used for determination of an edge is a 5×5 pixel block. As an element of the reference matrix, a value obtained by converting each pixel with a threshold value for determination of an edge pixel to two-valued data is set. FIG. 6 shows a simulated view for determination of an edge pixel. In determination of an edge, projections of the 5×5 pixel matrix in the X direction as well as in the Y direction are computed as xs [ ], and ys [ ].

As an example, xs [0], which is an element of xs [ ], is expressed by Expression 1, and the simulated view is shown in FIG. 7. Herein each element of the 5×5 pixel matrix is expressed as dxy.

$$sx=[0]d00 : :d01: :d02: :d03: d04 \quad \text{[Expression 1]}$$

This means that a logical sum of a screen tone pixel group is computed in FIG. 7. Each element of xs [ ], and ys [ ] is computed similarly.

Then continuity of projections in the X direction and y direction is determined through Expression 2 below using the xs [ ], and ys [ ] computed above. xs and ys obtained as a result of determination on continuity respectively becomes a logical product of each element as clearly shown by Expression 2.

$$xs=xs[0]\&\&xs[1]\&\&xs[2]\&\&xs[3]\&\&xs[4]$$

$$ys=ys[0]\&\&ys[1]\&\&ys[2]\&\&ys[3]\&\&ys[4] \quad \text{[Expression 2]}$$

Then a determination is made as to whether the central pixel X in FIG. 6 is an edge pixel or not. Determination of an edge pixel is executed, as shown by Expression 3, according to a logical product of xs and ys each obtained as a result of determination on continuity respectively.

$$X=xs: :ys \quad \text{[Expression 3]}$$

Then configuration of the screen tone graph/screen tone character area determining section 307 is described with reference to FIG. 8. The screen tone/screen tone character area determining section 307 comprises a screen dot image central edge detecting section 801, a screen dot image left side edge detecting section 802, a screen dot right side edge detecting section 803, a screen tone character area determining section 804, a screen tone graph area determining section 805, and an OR circuit 806.

Figure 9A:
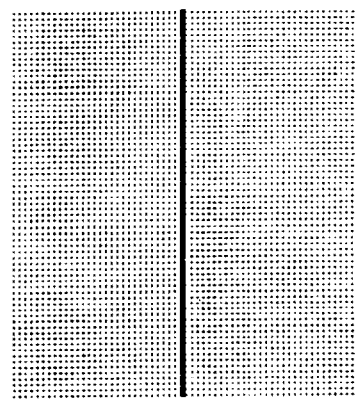
FIGS. 9A to 9C are explanatory views showing detection of edge pixels in a middle edge detecting section of a screen tone point image, a left side edge detecting section of a screen tone point image, and a right side edge section of a screen tone point image.
Figure 9B:
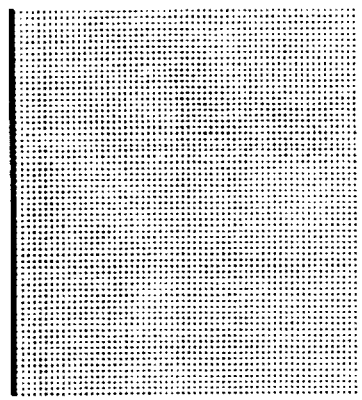
Figure 9C:
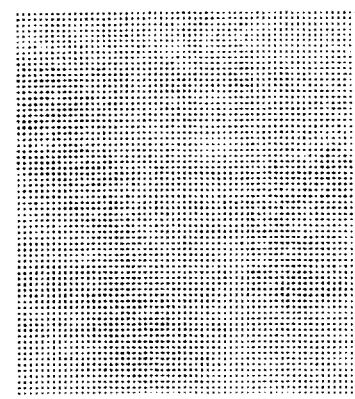

Herein the screen dot image central edge detecting section 801, screen dot image left side edge detecting section 802, and screen dot image right edge detecting section 803 detect an edge pixel in a screen dot image, an edge pixel present in the left side of the screen dot image, and an edge pixel present in the right side of the screen dot image respectively as shown in FIGS. 9A to 9C.

In detection, when an object pixel is an edge area pixel, a determination is made by checking for a pixel recognized that a black peak density within a certain area around the object pixel data within right and left WDTH pixels in the main scanning direction as a center is coincident to a prespecified black peak density of a copying-inhibited pattern, and the pixel is detected as a screen dot central edge pixel when the pixel satisfying the conditions above exists in both the right and left side, as a screen dot image left side edge pixel when the pixel satisfying the conditions above exists only in the right side from the edge pixel, or as a screen dot image right side edge pixel when the pixel satisfying the conditions above exists only in the left side from the edge pixel.

Then in the screen tone character area determining section 804, when a remarked pixel is a pixel with a black peak density determined as coincident to a black peak density of a copying-inhibited pattern and a screen dot image central edge pixel exists near the object pixel, the object pixel is determined as a screen tone character area pixel.

In the screen tone graph area determining section 805, when an object pixel is a pixel with a black peak density determined as coincident to a black peak density of a copying-inhibited pattern, a screen dot image left side edge pixel exists at the closest point within the left side LNGTH, and at the same time a screen dot image right side edge pixel exists at a closest point within the right side LNGTH, the object pixel is determined as a screen tone graph area pixel.

Finally, a logical sum of a result of determination for a screen tone character area and a result of determination for a screen tone graph area is computed for each pixel. With this operation, a screen tone character area and a screen tone graph area each having characteristics similar to a black peak of a copying-inhibited pattern can be determined.

Figure 10:
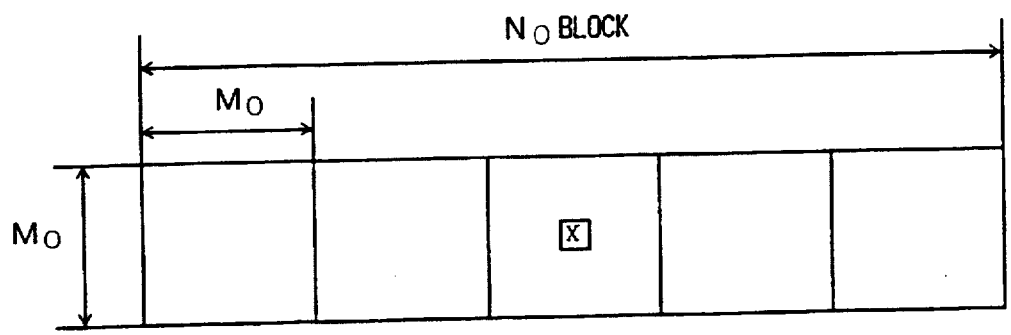
FIG. 10 is a simulated view of configuration of a pixel block used for determining processing in the illegal peak area determining section.

In the illegal peak area determining section 308, a result of determination by the black peak detecting section 301 is inputted, and a determination is made as to whether object pixel data determined as a pixel coincident to a black peak density of a copying-inhibited pattern is a illegal peak area pixel or not. FIG. 10 is a simulated view illustrating configuration of a pixel block used in a processing for determination in the illegal area determining section 308, while FIG. 11 is a flow chart illustrating operations for determination in the illegal peak area determining section 308.

The illegal peak area determining area 308 counts a number of black peaks in an $M_0 \times M_0$ pixel block (object pixel block) (S1101) including the object pixel X (Refer to FIG. 10), when a result of determination by the black peak detecting section 301 is inputted thereto. Similarly, the illegal peak area determining section 308 counts a number of black peaks in $N_0$ blocks before and behind including the object pixel block (S1102).

Then a number of black peaks in each of the $N_0$ blocks counted as described above is compared to a threshold value TH3 (S1103), and herein if there is even one block with black peaks not less than the threshold value TH3 among the $N_0$ blocks, the $M_0 \times M_0$ pixel block (remarked pixel block) including an object pixel is determined as an illegal peak area (S1104). If a number of black peaks in any of the $N_0$ blocks is smaller than the threshold value TH3, the $M_0 \times M_0$ pixel block (remarked pixel block) is determined as an non-illegal peak area (S1105).

Thus by executing determination of an illegal peak area, in the object pixel data determining section 305 described later, it is possible to prevent a copy of a document for screen dot printing or background dirt from being erroneously recognized as a copying-inhibited pattern.

When it is determined that an object pixel is coincident to a black peak density of a copying-inhibited pattern and at the same time it is determined that the object pixel is a peripheral white area pixel, and not a screen tone graph/screen tone character area pixel, not a illegal peak area depending on determinations by the black peak density determining section 302, peripheral white area determining section 304, screen tone graph /screen tone character area determining section 307, and illegal peak area determining section 308, the object pixel data determining section 305 shown in FIG. 3 determines that the object pixel data is a copying-inhibited pattern pixel, and outputs a result of determination for a copying-inhibited pattern.

(4) Copying-inhibited document determining section

Figure 12:
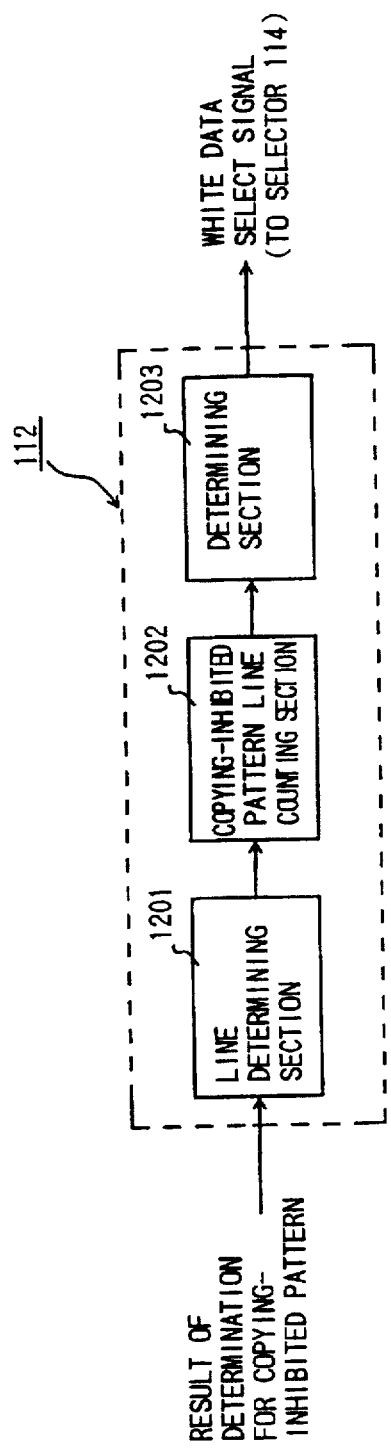
FIG. 12 is a block diagram of the copying-inhibited document determining section according to the present embodiment.

FIG. 12 is a block diagram of the copying-inhibited document determining section 112, and the copying-inhibited document determining section 112 comprises a line determining section 1201 for receiving a result of determination for a copying-inhibited pattern for each pixel data inputted from the object pixel data determining section 305 in the copying-inhibited pattern detecting section 111, counting a number of pixel data determined as a portion of a copying-inhibited pattern present in one line in the main scanning direction, and determining the line as a copying-inhibited pattern line if the counted value is not less than a first threshold value TH1 preset, a copying-inhibited pattern line counting section 1202 for storing a result of determination by the line determining section 1201 for N lines and counting a number of copying-inhibited pattern lines in the N line (counted value M), and a determining section 1203 for determining image data as a copying-inhibited document if a counted value M (M≦N) counted by the copying-inhibited pattern line counting section 1202 is not less than a second threshold value TH2 preset and outputting the white data select signal "1".

(5) Operations for determination of a copying-inhibited document

Figure 13:
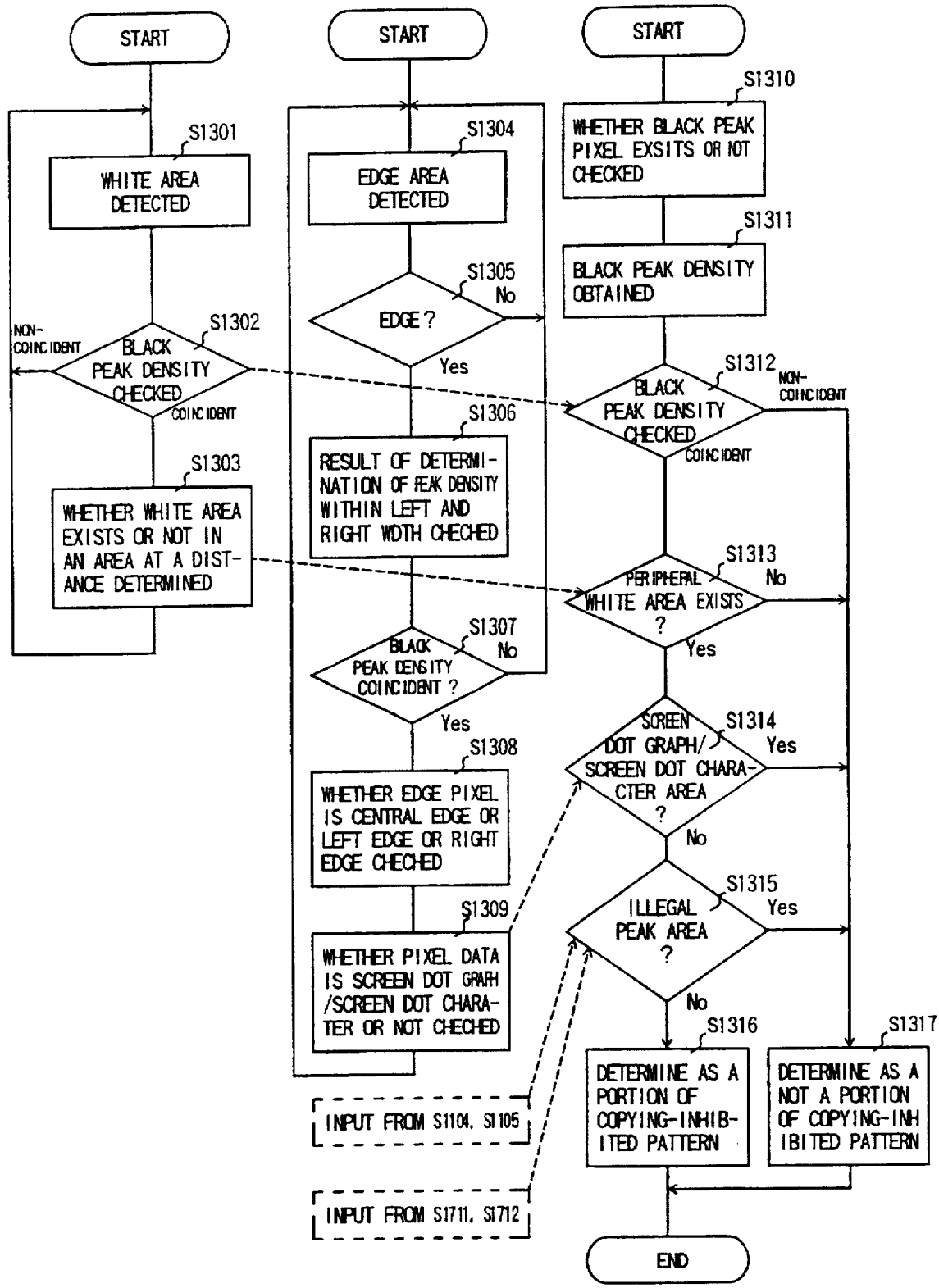
FIGS. 13A to 13C are operating flow charts of the copying-inhibited pattern detecting section according to the present embodiment.
Figure 14:
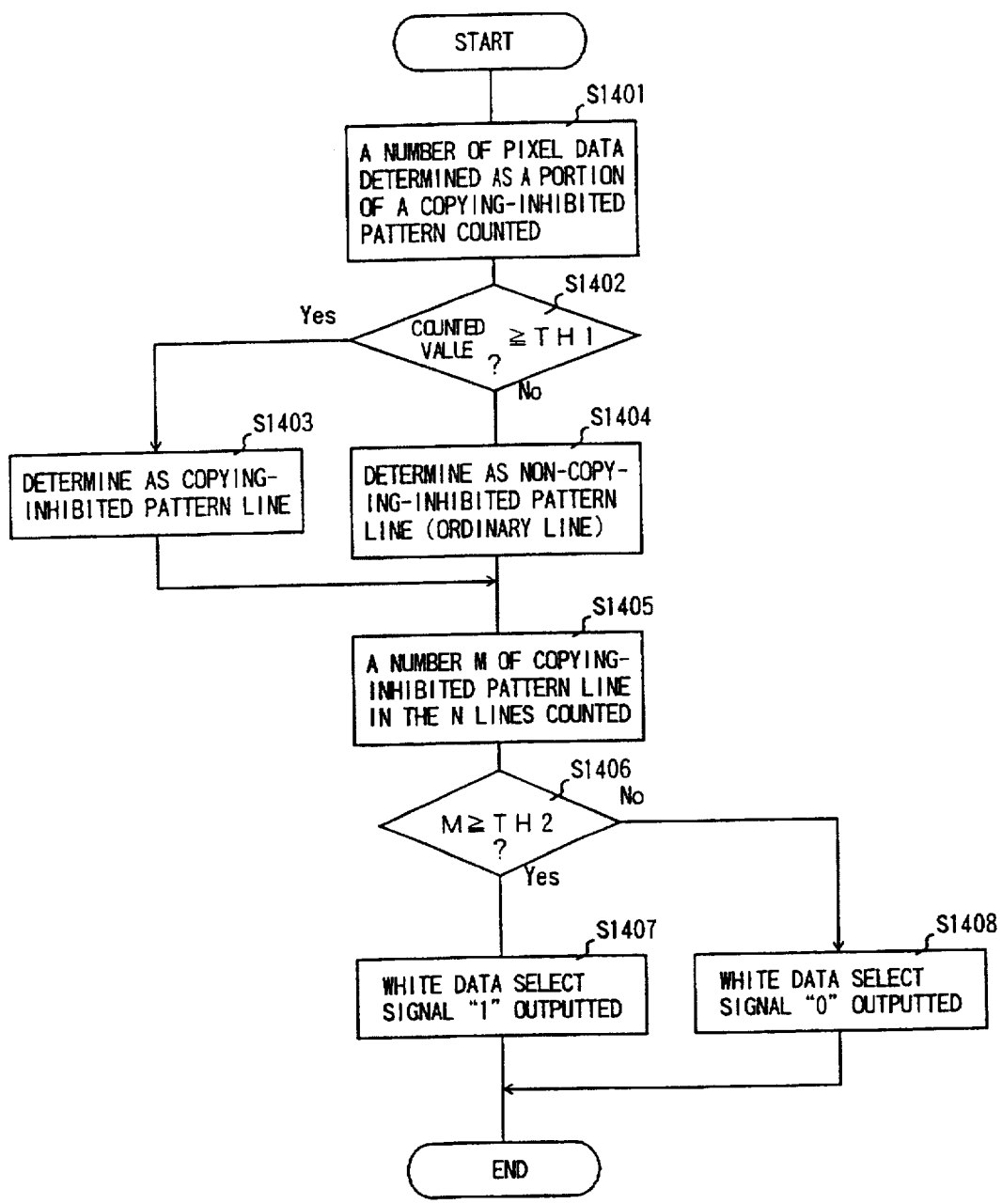
FIG. 14 is an operating flow chart of the copying-inhibited document determining section according to the present embodiment.

With the configuration as described above, now detailed description is made for operations for determination of a copying-inhibited document with reference to FIGS. 13A to 13C as well as to a flow chart shown in FIG. 14.

When a user sets a document (draft) to be copied at a specified position on a scanner 101 and presses down the COPY START key (not shown) in the operation display section 104, image data of the document is read by the scanner, and the image data is subjected to A/D conversion and then inputted as a digital signal into the image processing section 102.

The image processing section 102 subjects image data, which is a digital signal, to shading correction by the shading correcting section 106, and inputs the image data to both the filter processing section and copying-inhibited pattern detecting section 111. The image data inputted into the filter processing section 107 is subjected to a specified image processing in each of the filter processing section 107, size changing processing section 108, γ-correcting section 109, and gray level processing section 110 respectively, and then transferred to the selector 114.

As for the image data inputted into the copying-inhibited pattern detecting section 111, at first in the copying-inhibited pattern detecting section 111, a determination is made as to whether each individual data constituting the image data is a portion of a prespecified copying-inhibited pattern or not.

FIG. 13 is a flow chart illustrating operations of the copying-inhibited pattern detecting section 111, and FIG. 13A is a flow chart illustrating operations of the white area detecting section 303 as well as of the peripheral white area determining section 304, FIG. 13B is a flow chart illustrating operations of the edge area detecting section 306 as well as of the screen tone graph/screen tone character area determining section 307, and FIG. 13C is a flow chart illustrating operations of the black peak detecting section 301, black peak density determining section 302. It should be noted that operations shown in these three flow charts and operations for determination by the illegal peak area determining section 308 are executed concurrently.

As shown by the flow chart shown in FIG. 13A, at first the white area detecting section 303 checks for a white area within a certain area, and determines whether a white area exists or not (S1301). Then the peripheral white area determining section 304 receives a result of detection by the black peak density determining section 302, checks a black peak density (S1302), and, if the inputted result is coincident to the black peak density, makes a determination as to whether a white area exists or not in an area at a distance from a result of determination by the white area detecting section 303 and a pixel detected as a pixel with a density detected as coincident to the black peak density, and outputs a result of determination to the object pixel data determining section 305 (S1303). On the other hand, if it is not coincident to the black peak density, a processing to the object pixel data is terminated, and system control returns to S1301.

As shown by the flow chart in FIG. 13B, at first the edge area detecting section 306 computes projections in the X direction and in the Y direction within a reference matrix, and detects an edge area (S1304). Then whether the pixel is an edge pixel or not is checked (S1305), and if it is determined that the pixel is an edge pixel, a result of determination of a peak density within the right and left WDTH is checked (S1306). If there is an area with the black peak density determined as coincident to a black peak density of a copying-inhibited pattern in either the right or left WDTH or in both of them, whether the edge pixel is a screen dot central edge, or a screen dot left side edge, or a screen dot right side edge is checked (S1307, S1308). Then whether the pixel data is a screen tone graph/screen tone character area or not is checked, and a result of the determination is outputted to the object pixel data determining section 305 (S1309). If it is not an edge pixel, or if there is no pixel with a coincident black peak density, the processing to the object pixel data is terminated, and system control returns to S1304.

As shown by the flow chart in FIG. 13C, at first whether a black peak pixel is present or not is checked in the black peak detecting section 301 (S1310), then a black peak density is obtained in the black peak density determining section 302 (S1311), and the black peak density is determined (S1312). Herein, if not coincident to a black peak density of a copying-inhibited pattern, it is determined that the image data is not a portion of a copying-inhibited pattern (S1317).

On the other hand, if coincident, whether a peripheral white area pixel area is present or not is checked (S1313), and if there is no peripheral white pixel, it is determined that the image data is not a portion of a copying-inhibited pattern (S1317). If a peripheral white area pixel is present, whether the peripheral white area pixel is a screen tone graph/screen tone character area or not is determined (S1314), and if the pixel is a screen tone graph/screen tone character area, it is determined that the pixel is not a portion of a copying-inhibited pattern (S1317). If the pixel is not a screen tone graph/screen tone character area, whether the pixel is an illegal peak area or not is determined (S1315), and if the pixel is an illegal peak area, it is determined that the pixel is not a portion of a copying-inhibited pattern (S1317), and if the pixel is not an illegal peak area, it is determined that the pixel is a portion of a copying-inhibited pattern (S1316), and a processing to the object pixel is terminated.

It should be noted that each of the steps S1301 to S1317 is executed for each pixel data of image data, and finally is executed to the entire input image data.

FIG. 14 is a flow chart illustrating operations of the copying-inhibited document determining section 112. At first, a result of determination concerning a copying-inhibited pattern for each pixel data is inputted into the line determining section 1201, and then a number of pixel data determined as a portion of a copying-inhibited pattern present in one line in the main scanning direction is counted (S1401). Then the counted value is compared to the first threshold value TH1 (S1402), and if the counted value is equal to or larger than TH1, it is determined that the line is a copying-inhibited pattern line (S1403), and if the counted value is smaller than TH1, it is determined that the line is an ordinary line which is not a copying-inhibited pattern line (S1404).

Then a result of determination for N lines by the line determining section 1201 is stored in the copying-inhibited pattern line counting section 1202, and a number of copying-inhibited pattern line in the N lines (counted value M) is counted (S1405). Then the counted value M is compared to the second threshold value TH2 (S1406), and if the counted value M is equal to or larger than TH2, it is determined that the image data is a copying-inhibited document, and the white data select signal "1" is outputted (S1407). On the other hand, the counted value M is smaller than TH2, a white data select signal "0" is outputted (S1408), and the processing is terminated.

As described above, image data is transferred from both the gray level processing section 110 and white data generating device 113 to the selector 114. According to a result of determination by the copying-inhibited determining section 112 (white data select signal), the selector 114 selectively outputs white data inputted from the white data generating device 113 to the plotter 103 if the white data select signal is "1". If the white data select signal is "0", the selector 114 selectively outputs image data inputted from the gray level processing section 110 to the plotter 103.

For this reason, if a copying-inhibited pattern is detected and it is determined through the processing described above that the image data is a copying-inhibited document, the image data is substituted by white data, so that the image data, which is a copying-inhibited document, is not outputted to the plotter 103. In other words, copying of image data determined as a copying-inhibited document by the selector 114 is inhibited.

(6) Operations for forming a copying-inhibited pattern

Next description is made for operations for forming a copying-inhibited pattern using the copying-inhibited pattern synthesizing section 115. When a copying-inhibited pattern is to be formed on recording paper outputted from the plotter 103, in other words when a copying-inhibited document is prepared, at first a specified key on the operation display section 104 is pressed down to specify an operation for forming a copying-inhibited pattern. When the system controller 105 receives a copying-inhibited pattern form signal from the operation display section 104, a synthesization select signals to the copying-inhibited pattern synthesizing section 115 in the image processing section 102. According to the synthesized signal, the copying-inhibited pattern synthesizing section 115 synthesizes the copying-inhibited pattern shown in FIG. 2 to the image signal outputted from the selector 114, and outputs the synthesized signal as an image signal to the plotter 103. With this operation, recording paper (copying-inhibited document) with a copying-inhibited pattern formed thereon is outputted from the plotter 103.

As described above, in the present embodiment, if a black peak pixel (an object pixel) has a black peak density specified to a copying-inhibited pattern and at the same time a white area exists in a area at a distance away therefrom, it is determined that the object pixel data is a pixel of a copying-inhibited pattern, so that existence of a copying-inhibited pattern can easily be detected with high reliability.

Also a determination as to whether a line is a copying-inhibited pattern line or not is executed to each line, and when a number M of copying-inhibited pattern lines in the N lines exceeds a prespecified value, it is determined that the document is a copying-inhibited one, so that a copying-inhibited document can be determined without fail.

Furthermore whether a line is a copying-inhibited pattern line or not is checked for each line, and when a number M of copying-inhibited pattern lines in the N lines exceeds a prespecified value, it is determined that the document is a copying-inhibited one, and a portion determined as a copying-inhibited document can accurately be deleted even from on the way of a page by the white data generating device 113 and the selector 114.

Also in the present embodiment, a copying-inhibited pattern document can be prepared by synthesizing a copying-inhibited pattern with the copying-inhibited pattern synthesizing section 115 and outputting the synthesized copying-inhibited pattern onto recording paper via the plotter 103, so that, when the copying-inhibited document is read by a copier, the copying-inhibited pattern is recognized without fail and is determined as a copying-inhibited document, and for this reason copying, transfer, storage, and input of image data of a copying-inhibited document can be prevented without fail.

[EMBODIMENT 2]

Next description is made for Embodiment 2. It should be noted that configuration and operations in Embodiment 2 are generally the same as those in Embodiment 1, so that only a portion different therefrom will be described herein.

Figure 15:
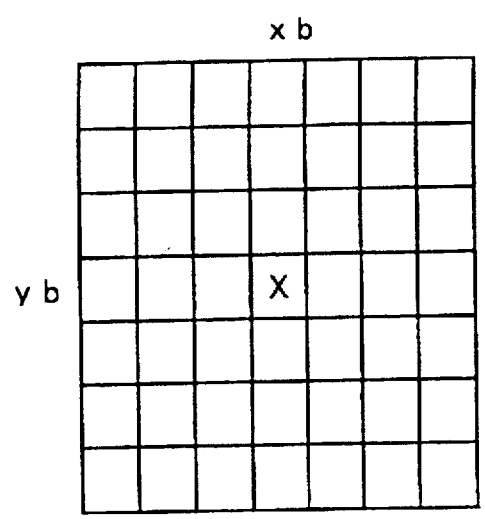
FIG. 15 is an explanatory view of a xb×yb pixel block used in the illegal peak area determining section in Embodiment 2.
Figure 16:
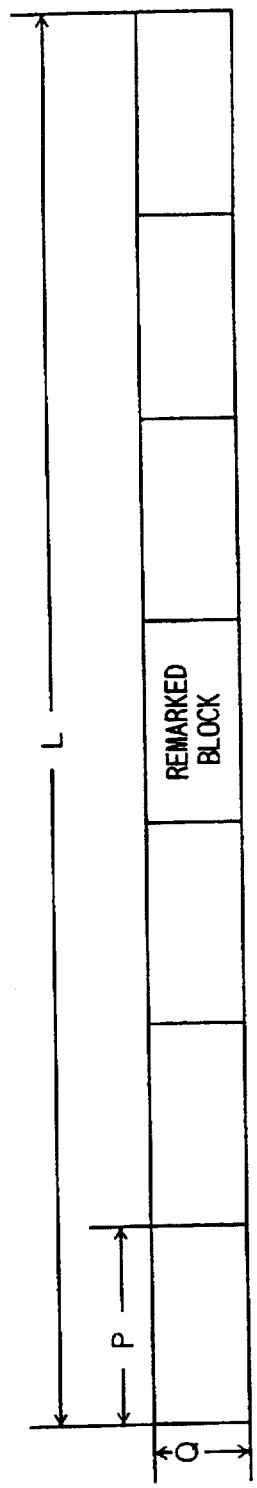
FIG. 16 is an explanatory view of a M×N pixel block and L block extending thereto used in the illegal peak area determining section in Embodiment 2.
Figure 17:
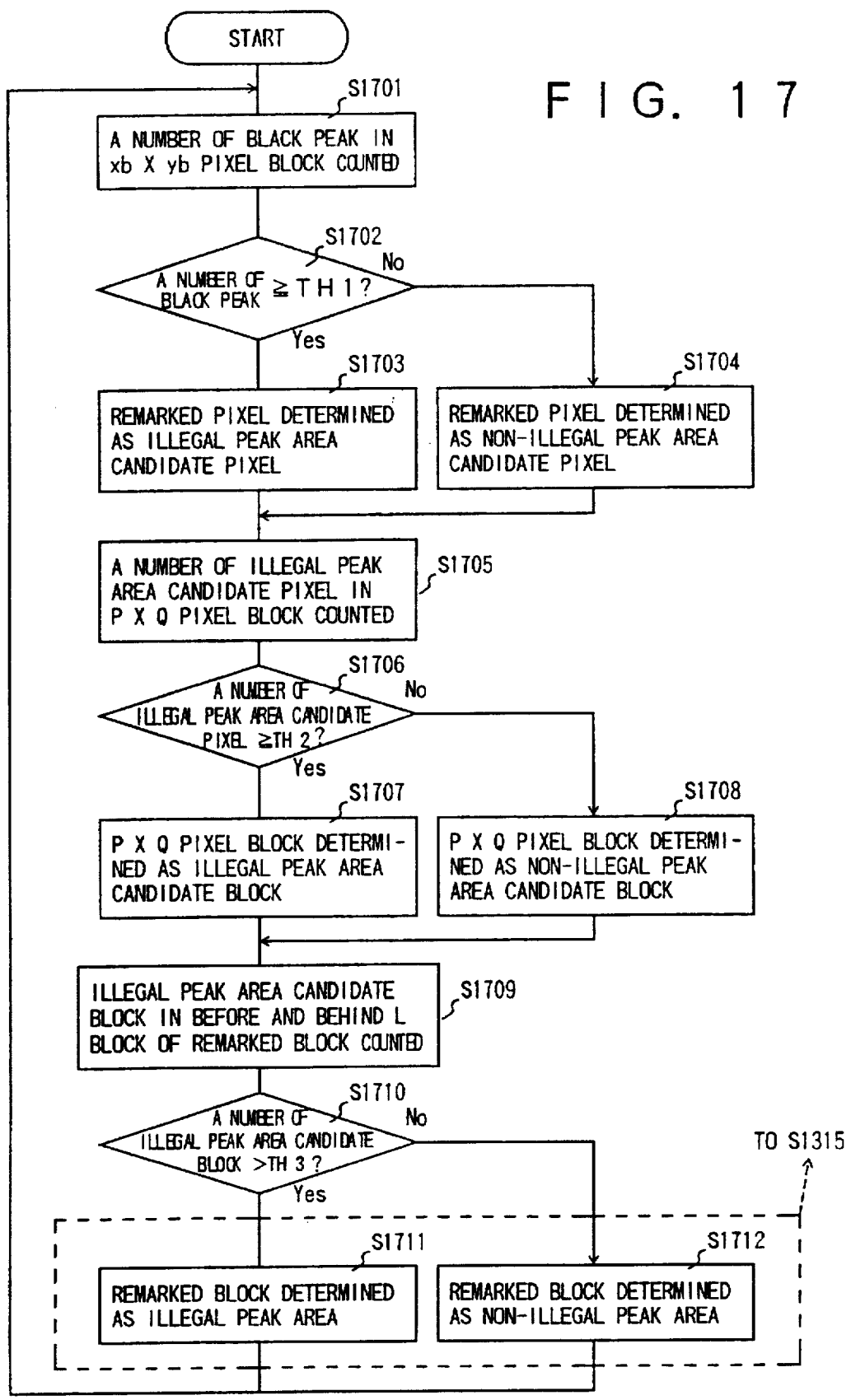
FIG. 17 is an operating flow chart of the illegal peak area determining section in Embodiment 2.

Concrete description is made for the illegal peak area determining section 308 according to Embodiment 2. FIG. 15 and FIG. 16 are simulated views each illustrating configuration of a pixel block used for determination in the illegal peak area determining section 308. FIG. 17 shows a flow illustrating processing for the illegal peak area determining section 308. At first, a number of black peaks in the xb×yb pixel block including an object pixel X shown in FIG. 15 is counted (S1701), and the counted number of black peaks is compared to the first threshold value TH1 (S1702), and if a number of black peaks is not less than TH1, an object pixel is regarded as an illegal peak area candidate pixel (S1703), and if a number of black peak is other than TH1, an object pixel is determined as a non-illegal peak area candidate pixel (S1704). Then a number of illegal peak area candidate pixels in the P×Q pixel block shown in FIG. 16 is counted (S1705), and the counted illegal peak area candidate pixel is compared to the second threshold value TH2 (S1706), and if a number of illegal peak area candidate pixels is not less than the threshold value TH2, an object block is regarded as an illegal peak area candidate block (S1707), and if it is other than TH2, the pixel block is determined as a non-illegal peak area candidate block (S1708). Then determination is made as to whether an object block is an illegal peak area or not depending on a number of illegal peak area candidate blocks in a plurality of blocks near the remarked block. Herein, as shown in FIG. 16, the illegal peak area candidate block in before and behind L block in the main scanning direction including the object block is counted (S1709) to compare to the third threshold value TH3 (S1710). Herein, if the counted number of illegal peak area candidate blocks is not less than the threshold value TH3, the object block is determined as an illegal peak area (S1711), and if not, the remarked block is determined as a non-illegal peak area (S1712). In the illegal peak area determining section 308, processing for preventing a copy of a document for screen dot printing or background dirt from being erroneously recognized as a control number printing pattern is executed.

Herein, the threshold value TH1 used for determination of an illegal peak area candidate pixel should be such a threshold value that a black peak density in the xb×yb pixel blocks is smaller than a black peak density in the black peak density determining section 302 in FIG. 3, which can be determined as an illegal peak area candidate pixel.

A determining block (xb×yb pixel block) used for detection of an illegal peak candidate pixel shown in FIG. 15 may be identical to a block used for determination of the black peak density determining section 302 in FIG. 3.

In Embodiment 2 as described above, if a black peak pixel (an object pixel) has a black peak density specified to a copying-inhibited pattern and at the same time a white area exists in an area at a distance away therefrom, it is determined that the object pixel data is a pixel of a copying-inhibited pattern, so that existence of a copying-inhibited pattern can easily be detected with high reliability.

Also if the illegal peak area determining section 308 makes a determination that an object pixel is in a illegal peak area, but that it is not a portion of the copying-inhibited pattern, operation for preventing a copy of a document for screen dot printing or background dirt from being erroneously recognized as a control number printing pattern can be executed, so that a copying-inhibited pattern can accurately be detected. Determination as to whether a line is a copying-inhibited pattern line or not is executed to each line, and furthermore if a number M of copying-inhibited pattern lines in N lines exceeds a prespecified value, it is determined that the document is a copying-inhibited one, so that a copying-inhibited document can be determined without fail.

Determination as to whether a line is a copying-inhibited pattern line or not is executed to each line, and furthermore if a number M of copying-inhibited pattern lines in N lines exceeds a prespecified value, it is determined that the document is a copying-inhibited document and a portion determined as a copying-inhibited document can accurately be eliminated even from the middle of a page by the white data generating means or 113 and the selector 114.

In Embodiment 2, a copying-inhibited pattern is synthesized by the copying-inhibited pattern synthesizing section 115, and is outputted onto a recording paper via the plotter 103 to prepare a copying-inhibited document, so that, when the copying-inhibited document is read by the own machine, a copying-inhibited pattern can accurately be recognized to determine the document as a copying-inhibited document, and for this reason determination of a copying-inhibited document can accurately be executed, and a copying-inhibited document can accurately be prevented from copying, transfer, storage, input of image data.

|EMBODIMENT 3|

Next description is made for Embodiment 3. Configuration and operations for Embodiment 3 are also the same on the whole as those for Embodiment 2, so that description is made herein for only a portion different therefrom.

In Embodiment 3, determination is made as to whether thinning lines in an auxiliary scanning direction should be executed via the operating display section 104 or not, and a parameter for internal operation in the copying-inhibited pattern detecting section 111 is changed, so that determination of a copying-inhibited document can accurately be executed even when an image is changed.

Figure 18:
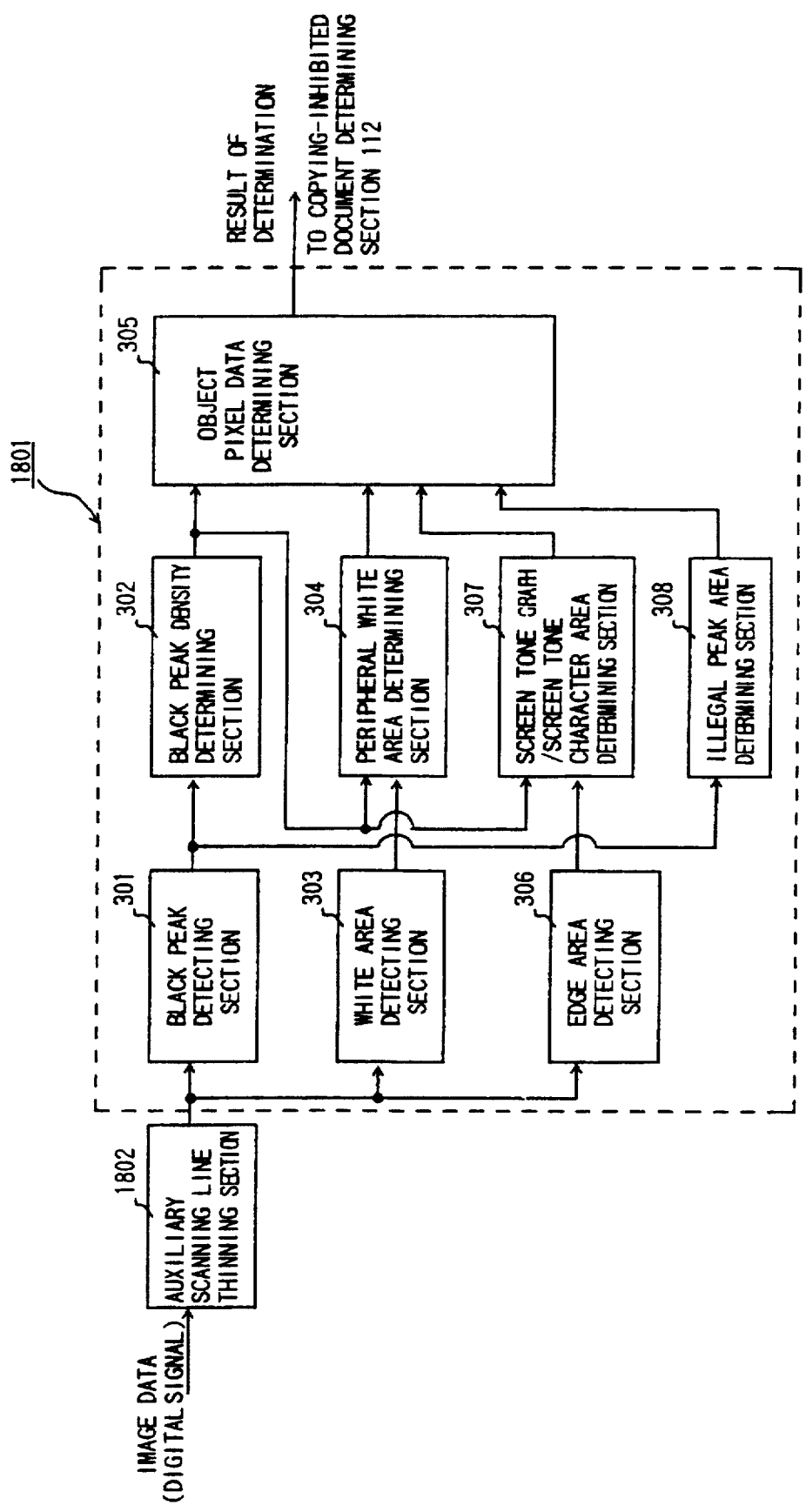
FIG. 18 is an explanatory view showing configuration of the copying-inhibited pattern detecting section in Embodiment 3.

FIG. 18 shows configuration of the copying-inhibited pattern detecting section 1801 according to Embodiment 3, and an auxiliary scanning line thinning section 1802 is added to the copying-inhibited pattern detecting section 111 (refer to FIG. 3) according to Embodiment 1. In the auxiliary scanning line thinning section 1802, thinning lines is executed according to an image changing rate when enlarged, and a line synchronizing signal used in the copying-inhibited pattern detecting section 1801 and the copying-inhibited document determining section 112 is generated.

Figures 19A, 19B, 19C, 19D:
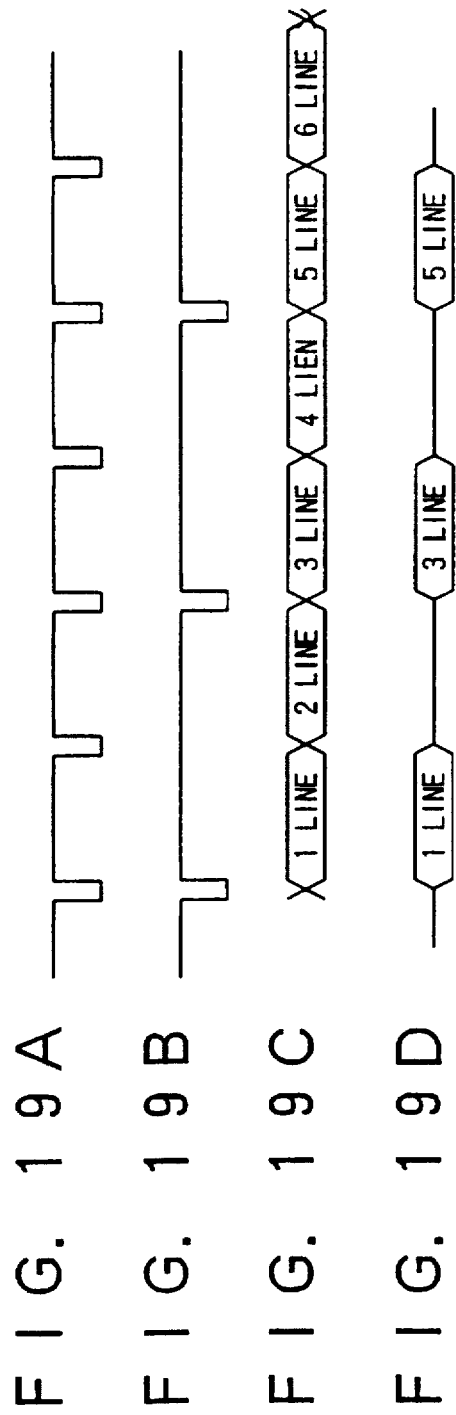
FIGS. 19A to 19D are explanatory views showing generation of thinning lines and a line synchronizing signal when an image changing rate is 200%.

For instance, when an image changing rate is 200%, a signal for thinning one line for each two lines is outputted to the copying-inhibited pattern detecting section 1801 by the auxiliary scanning line thinning section 1802. The line synchronizing signal generated at the time becomes as twice as the line synchronizing signal for image data inputted to the auxiliary scanning line thinning section 1802. FIG. 19 shows line thinning and generation of a line synchronizing signal when the image changing rate is 200%, and FIG. 19A shows a line synchronizing signal for image data inputted to the auxiliary scanning line thinning section 1802, and FIG. 19B shows a line synchronizing signal as twice as that generated in the auxiliary scanning line thinning section 1802, which becomes a line synchronizing signal used in the copying-inhibited pattern detecting section 1801 and copying-inhibited document determining section 112. Also, FIG. 19C shows a line of image data inputted to the auxiliary scanning line thinning section 1802, on the other hand, when an image changing rate is 200%, thinning one line for each two lines is executed and a line of image data is outputted from the auxiliary scanning line thinning section 1802 as shown in FIG. 19D.

Figure 20:
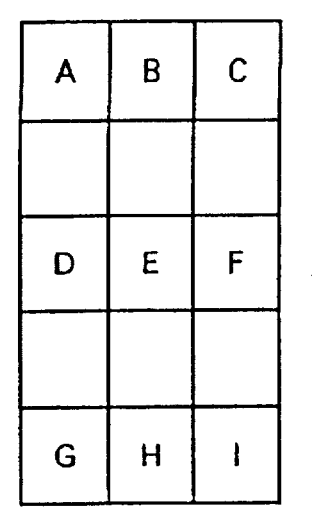

Then the copying-inhibited pattern detecting section 1801 changes a matrix each detected in the black peak detecting section 301, the edge area detecting section 306, and the illegal peak area determining section 308 according to an image changing rate. At first, when an image is enlarged, if line thinning in the auxiliary scanning line thinning section 1802 is not executed, detection is executed by using a 3×5 matrix shown in FIG. 20 in place of a 3×3 matrix shown in FIG. 4 in the black peak detecting section 301, and if line thinning in the auxiliary scanning line thinning section 1802 is executed, detection is executed by using a 3×3 matrix shown in FIG. 4 in the black peak detecting section 301. In this processing, operations are the same as those in Embodiment 1 other than only pixel positions of A to I in addition to E being different therefrom.

Figure 21:
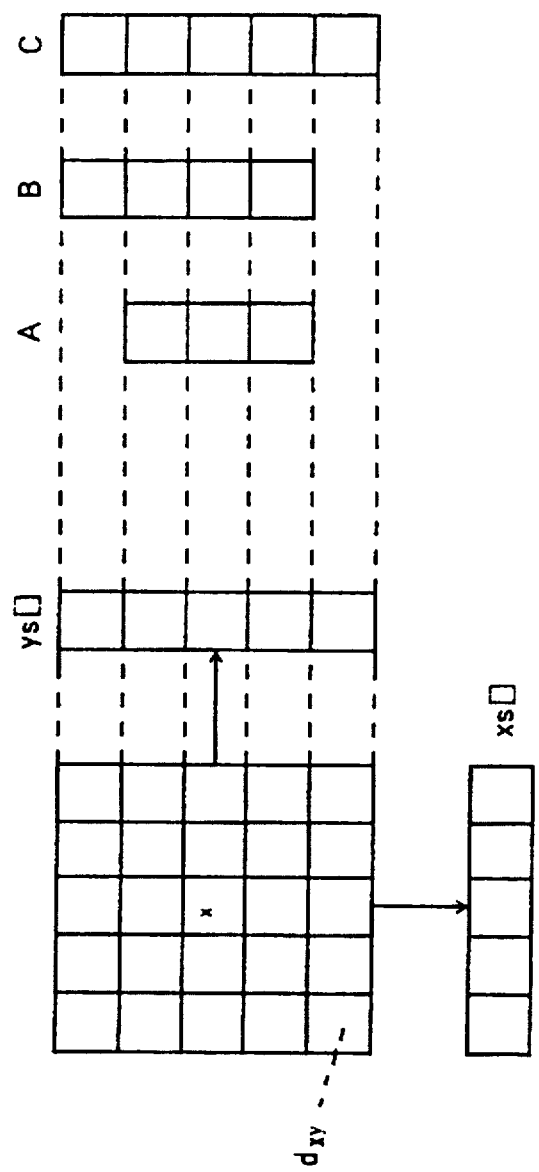
FIG. 21 is a simulated view of determination of an edge pixel in Embodiment 3.

In the edge area determining section 306, although determination of an edge pixel area is executed by checking a K×K pixel reference matrix, the following description of the present embodiment assumes that the reference matrix used for determination of an edge is a 5×5 pixel block. As an element of the reference matrix, a value obtained by converting each pixel with a prespecified threshold value for determination of an edge pixel to two-valued data is set. FIG. 21 shows a simulated view for determination of an edge pixel. In determination of an edge, projections of the 5×5 pixel matrix in the X direction as well as in the Y direction are computed as xs [ ], and ys [ ].

Herein, the operation of xs [ ] is executed like that in Embodiment 1, so that description thereof is omitted herein. ys [ ] operates, as shown in FIG. 21, by specifying A or B or C each in FIG. 21 according to an image changing rate.

In each of expressions for determination, the same operation as that in Embodiment 1 is executed although a size thereof is different from that in Embodiment 1. For instance, when an image is reduced by 50%, A in FIG. 21 is used. As a result of reading an image by varying a running speed of a scanner at an image changing in the auxiliary scanning direction, a length of a document to be read in the auxiliary direction becomes longer for each pixel as compared to that when an image is not changed, so that, A in FIG. 21 is used to correct that, which corresponds to documents each having the same length.

Figure 22:
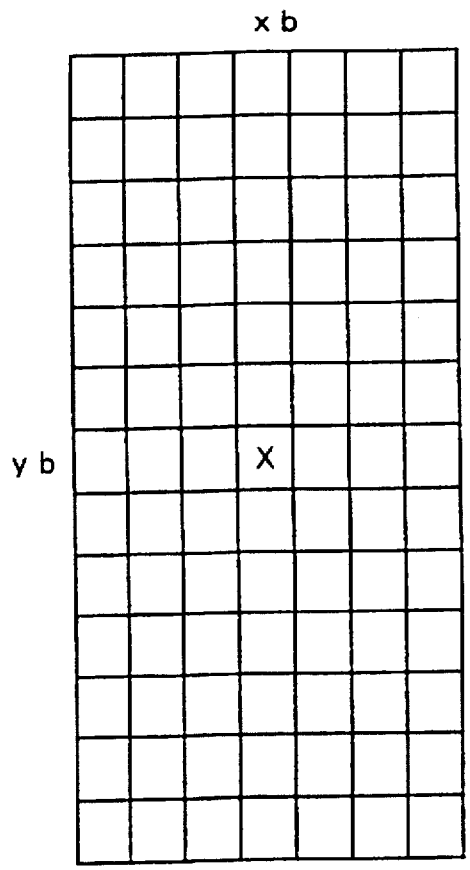
FIG. 22 is an explanatory view of a xb×yb pixel block used in the illegal peak area determining section in Embodiment 3.

In the illegal peak area detecting section 308, although determination is executed by a xb×yb pixel block for determination of an illegal peak area candidate pixel, description is made for an example of a 7×7 pixel block as a reference pixel block for determination in the present embodiment. For instance, when an image is enlarged by 200%, and if line thinning is not executed in the auxiliary scanning line thinning section 1802, detection is executed by using a 7×13 pixel block shown in FIG. 22 in place of a 7×7 pixel block shown in FIG. 15 in the illegal peak area determining section 308. When line thinning is executed in the auxiliary scanning line thinning section 1802, detection is executed by using a block with a number of reference pixels in the auxiliary scanning direction reduced in accordance with an image changing rate and a number of lines thinned in the illegal peak area determining section 308. For instance, if thinning one line is executed when an image is enlarged by 200%, image data is apparently regarded as the same image data as compared to that when an image is not changed, and for this reason, determination is made by using a 7×7 pixel block shown in FIG. 15.

Figure 23:
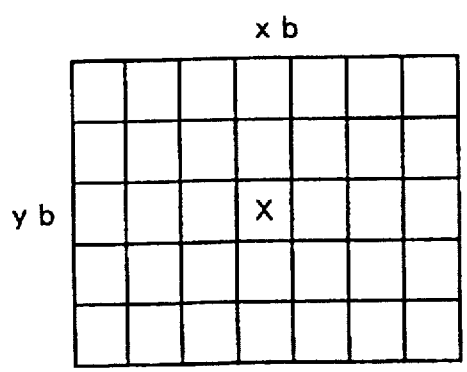
FIG. 23 is an explanatory view of a xb×yb pixel block used in the illegal peak area determining section in embodiment 3.

On the other hand, when an image is reduced by 75%, for instance, detection is executed by using a 7×5 pixel block shown in FIG. 23 in place of a 7×7 pixel block shown in FIG. 15.

When an image is enlarged, if a line thinning is executed in the auxiliary scanning line thinning section 1802, data is apparently equal to a case where reduced image data is inputted thereto in the copying-inhibited pattern detecting section 1801, and for this reason, the processing described above is executed.

[EMBODIMENT 4]

Next description is made for Embodiment 4. Also configuration of and operations in Embodiment 4 are the same as those in Embodiment 1 described above, so that description is made only for different points.

Figure 24:
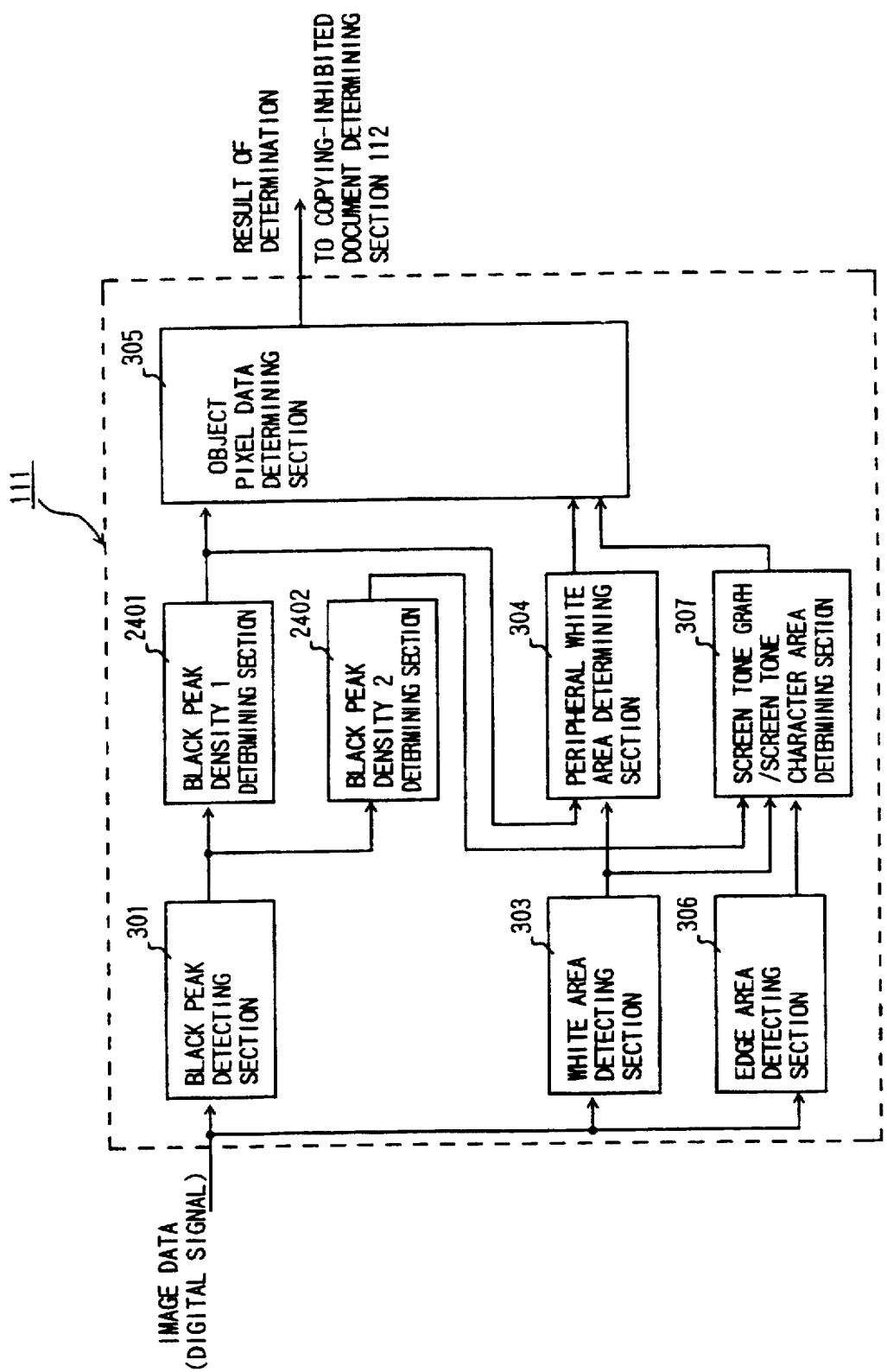
FIG. 24 is a block diagram of the copying-inhibited pattern detecting section in Embodiment 4.
Figure 25:
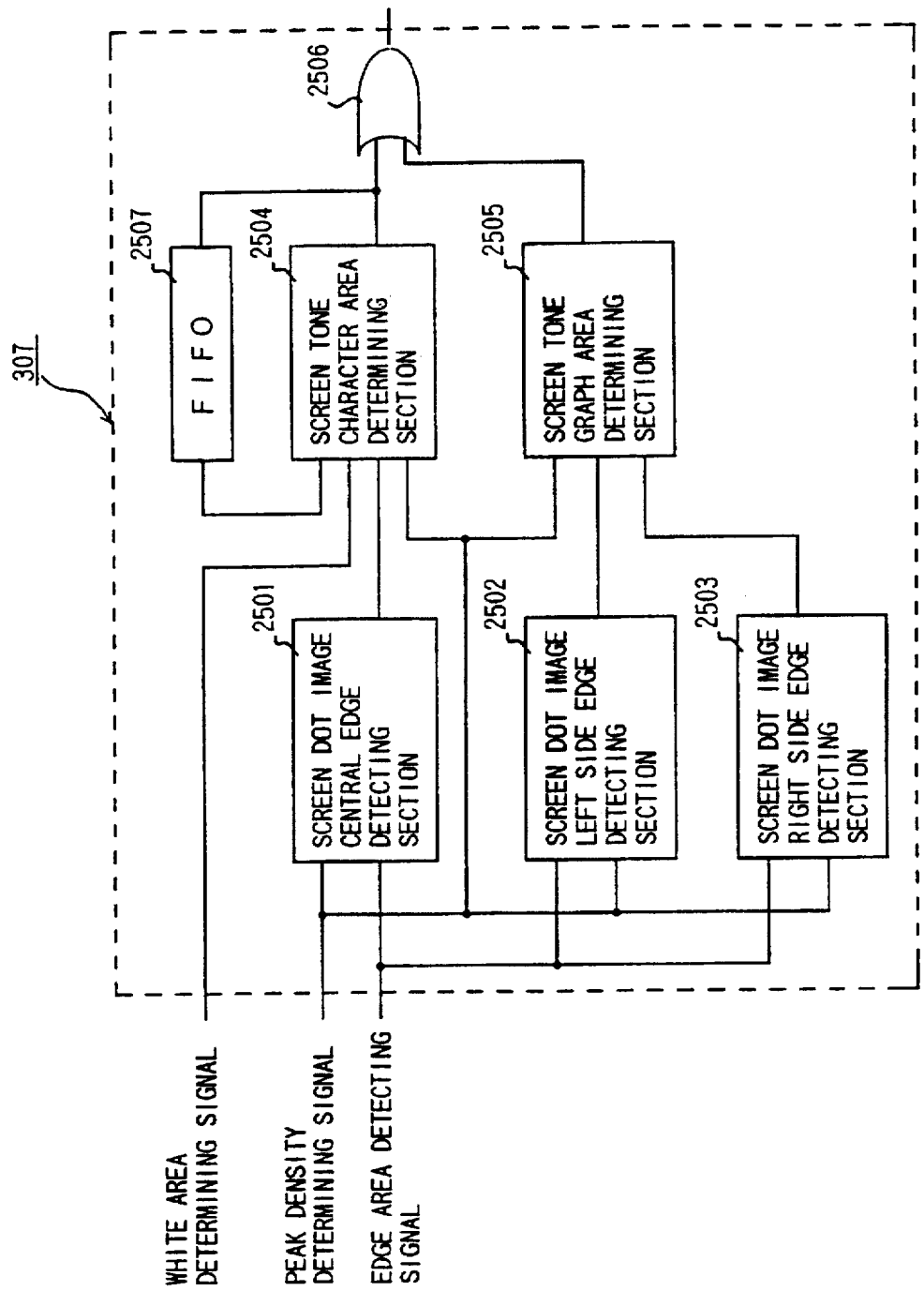
FIG. 25 is an explanatory view showing configuration of a screen tone graph/a screen tone character area determining section in Embodiment 4.

At first description is made for the copying-inhibited pattern detecting section 111 according to Embodiment 4. FIG. 24 is a block diagram of the copying-inhibited pattern detecting section 111, and the copying-inhibited pattern detecting section 111 comprises a black peak detecting section 301 for checking for individual pixel data constituting image data from an object pixel data and adjoining pixel data whether the object pixel is a black peak or not, a black peak density 1 determining section 2401 for receiving a result of detection by the black peak detecting section 301 inputted thereto and making a determination as to whether a black peak density within a certain area around a object pixel data as a center is coincident to a black peak density of a prespecified copying-inhibited pattern, a white area detecting section 303 for receiving image data inputted thereto and detecting a white area, an edge area detecting section 306 for receiving image data inputted thereto and detecting an edge area, a peripheral white area determining section 304 for receiving a result of determination by the black peak density 1 determining section 2401 and a result of detection by the white area detecting section 303 and making a determination as to whether a white area having a specified size exists in a peripheral area at a distance from object pixel data determined as a pixel with a black peak density coincident to that of a copying-inhibited pattern, a black peak density 2 determining section 2402 for receiving a result of detection by the black peak detecting section 301 and making a determination as to whether a black peak density within a certain area around the object pixel data as a center is not less than a prespecified threshold value or not, a screen tone graph/screen tone character area detecting section 307 for receiving a result of determination by the black peak density 2 determining section 2402, a result of detection by the edge area detecting section 306, and a result of detection by the white area detecting section 303 and making a determination as to whether the object pixel data is a screen tone graph/ screen tone character area pixel or not, and an object pixel data determining section 305 for determining whether the object pixel data is a portion of a copying-inhibited pattern or not according to a result of determination by the black peak density 1 determining section 2401, a result of determination of the peripheral white area determining section 304, and a result of determination by the screen tone graph/screen tone character area determining section 307.

Also the black peak density 1 determining section 2401 measures a black peak density within a certain area around object pixel data as a center (for instance, 11×11 pixel matrix) and makes a determination as to whether the measured black peak density is a peak density of around 65 lines specified to the copying-inhibited pattern 201 shown in FIG. 2.

Also the black peak density 2 determining section 2402 measures a black peak density within a certain area (for instance, 11×11 pixel matrix) around object pixel data as a center, and makes a determination as to whether the measured black peak density is not less than a prespecified threshold value.

Furthermore in the peripheral white area determining section 304, a determination is made as to whether a white area exists within an area at a distance away from a pixel determined as a black peak pixel. When checking for a white area, for instance, if a white area exists in area 502, 503, 504, and 505 each at a distance d in the directions of up, down, right and left from the object pixel 501, the object pixel 501 is determined as a pixel having a peripheral white area. Herein determination as to whether a white area exists or not is executed by checking the areas 502, 503, 504, and 506 in the four directions of up, down, left and right, but this determination may be executed by checking the areas 502 to 509 in the eight directions of up, down, left, right, diagonally left up, diagonally right up, diagonally right down, and diagonally left down to improve the precision in determination of a peripheral white area as shown in FIG. 5B. Also the determination may be executed by checking only the areas 502, 503 in the directions of up and down in FIG. 5A to reduce a quantity of hardware for the purpose to simplifying the configuration.

Next description is made for configuration of the screen tone graph/screen tone character area determining section 307. The screen tone graph/screen tone character area determining section 307 comprises a screen dot image central edge detecting section 2501, a screen dot image left side edge detecting section 2502, a screen dot image right side edge detecting section 2503, a screen tone character determining section 2504, a screen tone area determining section 2505, and OR circuit 2506, and a FIFO 2507.

Herein the screen dot image central edge detecting section 2501, screen dot image left side edge detecting section 2502, and screen dot image right side edge detecting section 2503 detects an edge pixel in a screen dot image, an edge pixel present in the left side of a screen dot image, and an edge pixel present in the right side of a screen dot image as shown in FIG. 9A to FIG. 9C respectively.

Each detection is performed by checking, when a remarked pixel is an edge area pixel, for a pixel determined by the black peak density 2 determining section 2402 as having a black peak density higher than a certain threshold value present within a certain area around object pixel data as a center among the right and left WDTH pixels in the main scanning direction and determining the pixel as a screen dot image central edge pixel when such a pixel exists in both the right and left side, as a screen dot image left side edge pixel when such a pixel exists only in the right side, or as a screen dot image right side edge pixel when such a pixel exists only in the left side of the edge pixel.

Then in the screen tone character area determining section 2504, when screen dot image central edge pixels are present at a density higher than a prespecified threshold value within a certain area including an object pixel, or when a pixel in a line just before a line on which an object pixel is present is a screen tone character area pixel, if an object pixel is a non-white area pixel or a number of black peaks within a certain pixel blocks including the object pixel is not less than a respecified threshold value, the remarked pixel is determined as a screen tone character area pixel.

Also in the screen tone graph area determining section 2505, when an object pixel is a pixel determined by the black peak density 2 determining section 2402 as having a black peak density higher than a certain threshold value, a screen dot image left side edge pixel exists at the closest point within the left side LNGTH, and at the same time a screen dot image right side edge pixel exists at the closest point within the right side LNGTH, the object pixel is determined as a screen tone graph area pixel.

Finally a logical sum of a result of determination concerning a screen tone character area and a result of determination concerning a screen tone graph area is computed by the OR circuit 2506 for each pixel. With this operation, a screen tone character area and a screen tone graph can be determined.

The remarked area data determining section 305 shown in FIG. 24 determines the object pixel data as a copying-inhibited pattern pixel and outputs a result of determination concerning a copying-inhibited pattern according to a result of determination by the black peak density 1 determining section 2401, a peripheral white area determining section 304, and screen tone graph /screen tone character area determining section 307 when it is determined that the object pixel has a black peak density coincident to a black peak density of a copying-inhibited pattern and is a peripheral white area pixel, and also that the object pixel is not screen tone graph/screen tone character area pixel.

Figure 26:
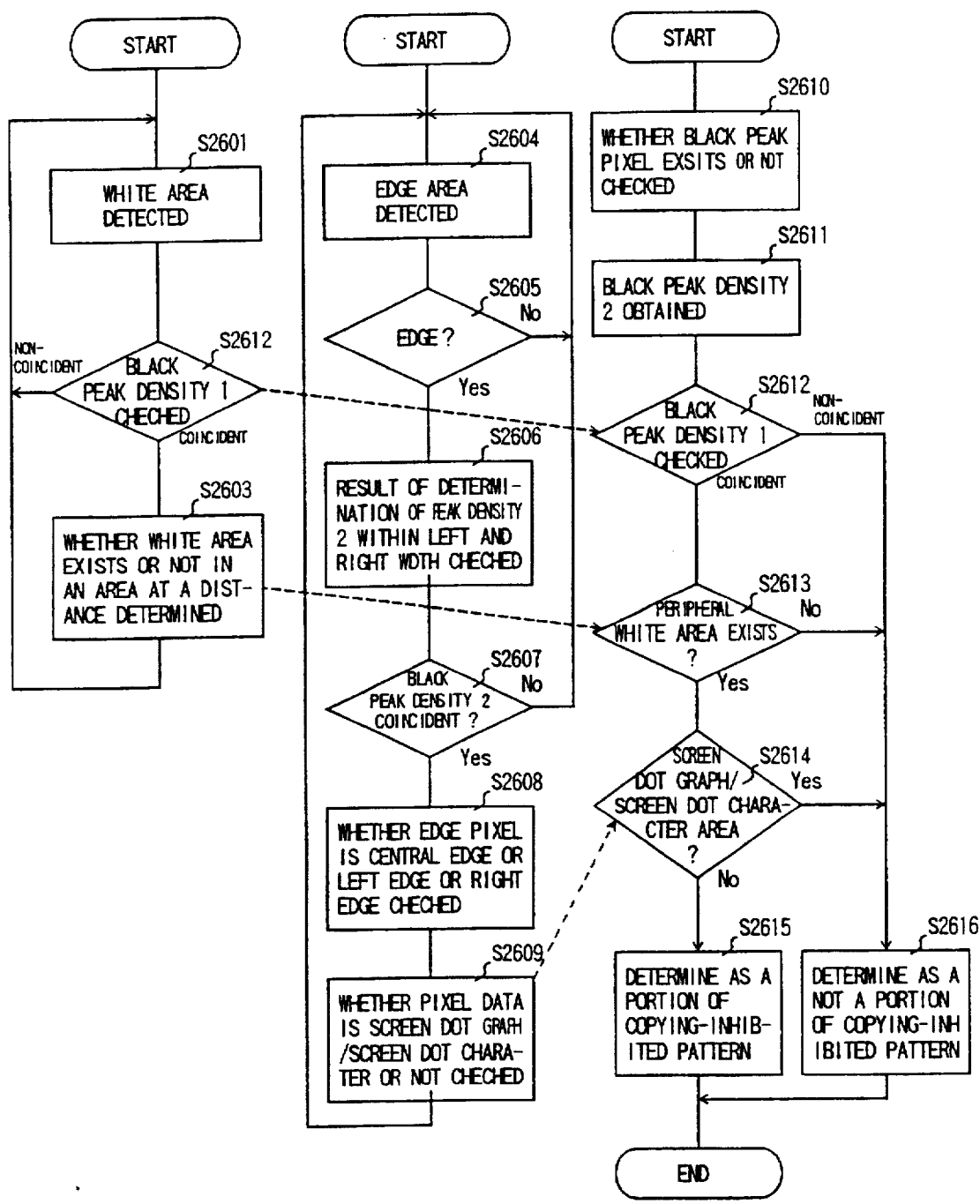
FIGS. 26A to 26C are operating flow charts of the copying-inhibited pattern detecting section in Embodiment 4.

With the configuration described above, next detailed description is made for operations for determination of a copying-inhibited document with reference to flow charts shown in FIG. 26A to FIG. 26C as well as to a flow chart in FIG. 14.

FIGS. 26A to 26C are flow charts showing operations of the copying-inhibited pattern detecting section 111 with FIG. 26A showing an flow chart for operations of the white area detecting section 303 and the peripheral white area determining section 304, FIG. 26B showing a flow chart for operations of the edge area detecting section 306 and screen tone graph/screen tone character area determining section 307, and FIG. 26C showing a flow chart for operations of the black peak detecting section 301, black peak density 1 determining section 2401, and object pixel data determining section 305. It should be noted that the operations in these three flow charts are executed concurrently.

As shown by the flow chart in FIG. 26A, at first the white area detecting section 303 checks for a white area within a certain area to make a determination as to whether a white area exists there or not (S2601). Then the peripheral white area determining section 304 receives a result of determination by the black peak density 1 determining section 2401 inputted thereto to determine whether the inputted black peak is coincident to the black peak density 1 or not (S2602), and, if the inputted black peak density is coincident to the black peak density 1, checks for a white area within an area at a distance away from a result of detection by the white area detecting section 303 and a pixel detected as a pixel having a black peak density coincident to the black peak density 1 and outputs a result of determination to the remarked object pixel data determining section 305 (S2603). On the other hand, if the pixel does not have a black peak density coincident to the black peak density 1, a processing to the object pixel data is terminated, and system control returns to S2601.

As shown by the flow chart in FIG. 26B, at first the edge area detecting section 306 computes projections in the X-axial direction and Y-axial direction within a reference matrix to detect an edge section (S2604). Then the edge area detecting section 306 makes a determination as to whether the pixel is an edge pixel or not (S2605), and if the pixel is an edge pixel, the edge area detecting section 306 checks a result of determination by the black peak density 2 determining section 2402 within the right and left WDTH (S2606). If a black peak density 2 pixel exists in either right or left WDTH or in both of them, whether the edge pixel is a screen dot central edge, a screen dot left side edge, or a screen dot right side edge is checked (S2607, S2608). Then whether the pixel is a screen dot graph/screen dot character area or not is checked, and a result of determination is outputted to the object pixel data determining section 305 (S2609). If the pixel is not an edge pixel or there is no pixel having a black peak density coincident to the black peak density 2, a processing to the object pixel data is terminated, and system control returns to S2604.

As shown by the flow chart in FIG. 26C, at first checking for a black peak pixel is executed in the black peak detecting section 301 (S2601), then a black peak density 1 is obtained in the black peak density 1 determining section 2401 (S2611) to determine the black peak density 1 (S2612). Herein, if the black peak density 1 is not coincident to a black peak density of a copying-inhibited pattern, it is determined that the pixel is not a portion of a copying-inhibited pattern (S2616).

On the other hand, if the black peak density 1 is coincident to a black peak density of a copying-inhibited density, whether there is a peripheral white pixel area or not is checked (S2613), and if the pixel has no peripheral white area, it is determined that the pixel is not a portion of a copying-inhibited pattern (S2616). If the pixel has a peripheral white area, whether the pixel is a screen tone graph/screen tone character area or not is determined (S2614), and if the pixel is a screen tone graph/screen tone character area, it is determined that the pixel is not a potion of a copying-inhibited pattern (S2616). If the pixel is not a screen tone graph/screen tone character area, it is determined that the pixel is a portion of a copying-inhibited pattern (S2615), and a processing to the object pixel is terminated.

It should be noted that each of the steps S2601 to S2616 is executed to each pixel data of image data and is finally executed to the entire inputted image data.

FIG. 14 is a flow chart for operations of the copying-inhibited document determining section 112, and the operations were already described above, so that description thereof is omitted herein.

For this reason, with the processing described above, when a copying-inhibited pattern is detected, if the document is determined as a copying-inhibited document, the image data is rewritten to white data, so that the image data, which is a copying-inhibited document, is not outputted to the plotter 103. In other words, copying of the image data which is a copying-inhibited document, is inhibited by the selector 114.

As described above, in Embodiment 4, when a black peak pixel (object pixel) has a black peak density specific to a copying-inhibited pattern and at the same time a white area is present in an area at a distance away therefrom, the object pixel data is determined as a pixel of a copying-inhibited pattern, so that presence of a copying-inhibited pattern can easily be detected at a high reliability.

Also the screen tone character area determining section 2504 in the screen tone graph/screen tone character area determining section 307 makes a determination as to whether an object pixel is a screen tone area or not according to a result of determination as to whether a black peak density within a certain area including the object pixel is not less than a prespecified threshold value or not as well as a result of detection by the edge area detecting section 306, a result of determination as to whether a pixel in a line just before a line in which the object pixel is present is a screen tone character area pixel or not, and a result as to whether the object pixel is a non-white area pixel or not, so that detection of a screen tone character area and determination of a copying-inhibited document can be executed at a high reliability.

Also whether a line is a copying-inhibited pattern line or not is checked for each line, and when a number M of copying-inhibited pattern lines in N lines exceeds prespecified value, the document is determined as a copying-inhibited document, so that determination of a copying-inhibited document can accurately be executed without fail.

Also a determination as to whether a line is a copying-inhibited line or not is executed for each line, and when a number M of copying-inhibited pattern line in N lines exceeds a prespecified value, the document is determined as a copying-inhibited document and also a portion determined as a copying-inhibited document can be deleted even from on the way of a page by the white data generating device 113 and the selector 114 without fail.

Also in Embodiment 4, a copying-inhibited pattern can be prepared by synthesizing it with the copying-inhibited pattern synthesizing section 115 and outputting it onto the recording paper through the plotter 103, so that, when the copying-inhibited document is read by a user's machine, the copying-inhibited pattern can is recognized without fail and is determined as a copying-inhibited document, so that determination of a copying-inhibited document can be executed without fail and also copying, transfer, storage and input of the copying-inhibited document can be inhibited without fail.

[EMBODIMENT 5]

Next description is made for Embodiment 5. In embodiment 5, whether thinning out in the auxiliary scanning direction should be executed or not is decided through the operation display section 104 and parameters for internal processing in the copying-inhibited pattern detecting section 111 are executed, so that, even when a size of an image is changed, determination of a copying-inhibited document can accurately be executed without fail. It should be noted that configuration and operations of Embodiment 5 are almost the same as those in Embodiment 1, so that description is made only for different points herein.

Figure 27:
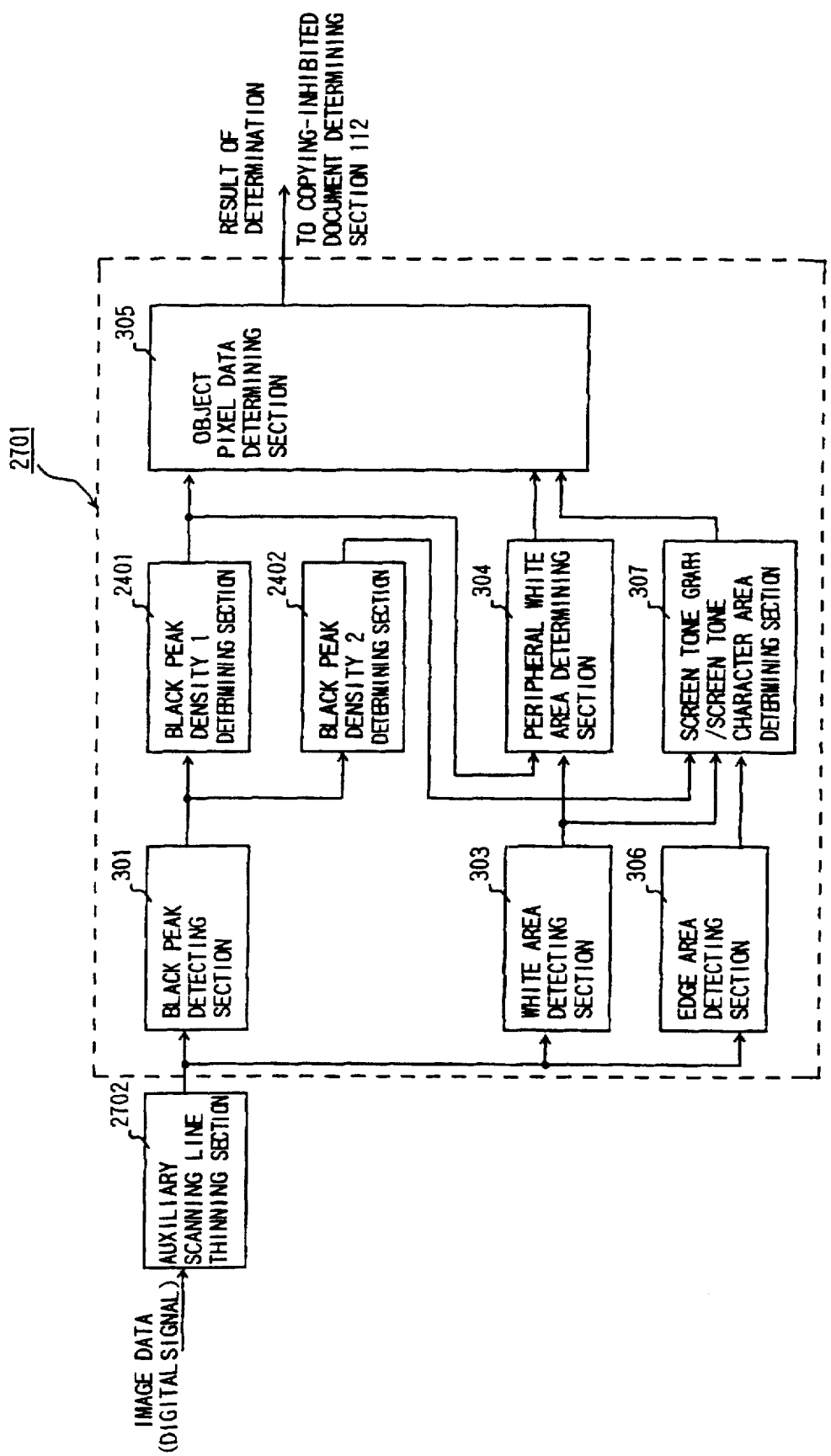
FIG. 27 is an explanatory view showing configuration of the copying-inhibited pattern detecting section in Embodiment 5.

FIG. 27 shows configuration of a copying-inhibited pattern detecting section 2701 according to Embodiment 5, in which an auxiliary scanning line thinning section 2702 is added to the copying-inhibited pattern detecting section 111 shown in FIG. 24. In the auxiliary scanning line thinning section 2702 line are thinned out according to a magnification of changing a size of an image, and also a line sync. signal used in the copying-inhibited pattern detecting section 2701 as well as in the copying-inhibited document determining section 112 is generated.

For instance, when the magnification for changing a size of an image is 200%, a signal for thinning 1 line for every 2 lines is outputted from the auxiliary scanning line thinning section 2702 to the copying-inhibited pattern detecting section 2701. Also the line sync. signal generated then becomes two times larger than a line sync. signal for inputted image data to the auxiliary scanning line thinning section 2702. FIG. 14 shows generation of line thinning and line sync. signals in the case of magnification for 200% with FIG. 14A showing a line sync. signal for inputted image data to the auxiliary scan line thinning section 2702, and FIG. 14B showing the twice larger line sync. signal generated in the auxiliary scan line thinning section 2702, and this is a line sync. signal used in the copying-inhibited pattern detecting section 2701 and the copying-inhibited document determining section 112. Also FIG. 14C shows a line for inputted image data to the auxiliary scanning line thinning section 2702, and when the magnification is 200%, one line is thinned out from every two lines, and a line for the image data is outputted as shown in FIG. 14B from the auxiliary scanning line thinning section 2702.

Then the copying-inhibited pattern detecting section 2701 changes a detection matrix in the black peak detecting section 301 as well as in the edge area detecting section 306 according to a magnification. At first, when an image is enlarged, if line thinning is not executed in the auxiliary scanning line thinning section 2702, in the black peak detecting section 301, in place of the 3×3 matrix shown in FIG. 4, detection is executed by using the 3×5 matrix shown in FIG. 20, and when line thinning is executed in the auxiliary scanning line thinning section 2702, in the black peak detecting section 301, detection is executed by using the 3×3 matrix shown in FIG. 4. Operations in this processing is the same as those in Embodiment 4 excluding that the pixel positions A to I excluding E are different.

Figure 28:
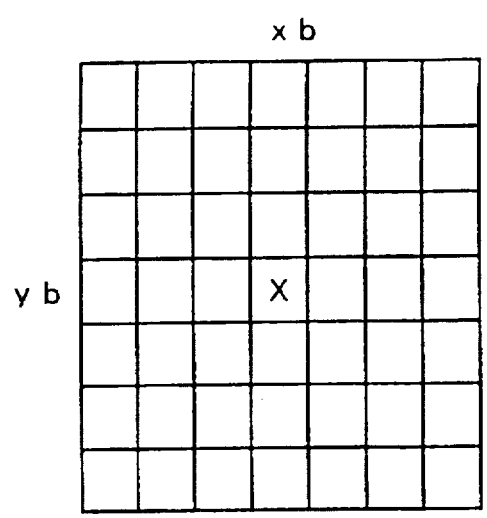
FIG. 28 is an explanatory view of a pixel block used in the black peak density 2 determining section.

Next description is made to the black peak density 2 determining section 2402 with reference to a reference pixel block for determination, and for the present embodiment with reference to a 7×7 pixel block as an example. For instance, when an image is enlarged by 200%, if line thinning is not executed in the auxiliary scanning line thinning section 2702, in the black peak density 2 determining section 2402, detection is executed by using the 7×13 pixel block shown in FIG. 22 in place of the 7×7 pixel block shown in FIG. 28. When line thinning is executed in the auxiliary scanning line thinning section 2702, detection is executed in the black peak density 2 determining section 2402 by using a block in which a number of reference pixels in the auxiliary scanning direction is reduced according to a magnification as well as to a number of lines to be thinned out. For instance, when an image is enlarged by 200%, if one line thinning is executed, the image is apparently regarded as the same image data when an image is copied with the same size, and determination is executed by using the 7×7 pixel blocks shown in FIG. 28. Also when a size of an image is reduced by 71%, detection is made by using the 7×5 pixel blocks shown in FIG. 23 in place of the 7×7 pixel block shown in FIG. 28.

When an image is enlarged, if line thinning is executed in the auxiliary scanning line thinning section 2702, the size-reduced image data becomes apparently equivalent to the inputted image data in the copying-inhibited pattern detecting section 2701, so that the processing described above is executed.

Although the present invention was described above with reference to a case where the image processing apparatus according to the present invention is applied to a digital copier, but this invention is not limited to this case, and if the image processing apparatus according to the present invention is applied to a facsimile machine, facsimile transmission can be inhibited by means of the same processing. Also when applied to an image filing apparatus, filing of a copying-inhibited document can be inhibited by means of the same processing. Furthermore when applied to a scanner, reading of a copying-inhibited document can be inhibited by means of the same processing.

Although the present embodiment was described above with reference to a case where image data for a copying-inhibited document is substituted with white data, the image data may be substituted with black data, or with data having a specified pattern.

The image processing apparatus according to the present invention has a black peak detecting means for detecting whether the object pixel is a black peak or not from the object pixel data and the pixel data adjoining it for each pixel data constituting image data, and receives a result of detection by the black peak detecting means inputted thereto and makes a determination as to whether or not a black peak density in an area around object pixel data as a center coincides with a black peak density of the previously decided copying-inhibited pattern. Also a white area is detected by receiving the image data inputted thereto, an edge area is detected by receiving the image data inputted thereto, and determination is made as to whether a white area having a specified size exists or not within a peripheral area at a distance from the object pixel data determined as a pixel coincident to a black peak density of the copying-inhibited pattern, and also determination is made as to whether object pixel data determined as a pixel coincident to a black peak density of the copying-inhibited pattern is a screen tone graph or a screen tone character area pixel or not. Also determination is made whether or not object pixel data determined that a black peak density of a specified pixel block including object pixel data is a pixel coincident to a black peak density of the previously decided copying-inhibited pattern is an illegal peak area pixel, namely, when a black peak density of the first area including object pixel is not less than a first threshold value smaller than the threshold value used for the black peak density determining means, object pixel is determined as an illegal peak area candidate pixel, and when the illegal peak area candidate pixel is not less than a second threshold value in a second area including object pixel, the second area is determined as an illegal peak area candidate block, then when the illegal peak area candidate block is not less than a third threshold value in a third area, the second area including object pixel is determined as an illegal peak area. Furthermore determination is made as to whether image data is the copying-inhibited document or not according to whether or not object pixel is a pixel coincident to a black peak density of the copying-inhibited pattern, whether or not a white area having a specified size exists within a peripheral area at a distance, whether or not a current pixel is a screen tone graph or a screen tone character area pixel, and whether or not a current pixel is an illegal peak area pixel, so that a copying-inhibited document prepared by using paper with a copying-inhibited pattern previously printed or copied on the entire paper can accurately be recognized, and copying, transfer, storage, input of image data of a copying-inhibited document can accurately be prohibited.

In the image processing apparatus according to the present invention, the first area used for the illegal peak area determining means is set to be identical to the area used for the black peak density determining means, so that a hardware rate can be reduced.

In the image processing apparatus according to the present invention, the third area used for the illegal peak area determining means is set to the area to which the second area used for the illegal peak area determining means is extended in the main scanning direction, so that a line memory rate can be reduced.

In the image processing apparatus according to the present invention, when size of an image is changed, the first area including an object pixel in the illegal peak area determining means is changed in the scanner running direction, so that detection of the illegal peak area and determination of the copying-inhibited document can precisely be executed even when size of an image is changed.

In the image processing apparatus according to the present invention, the illegal peak area determining means makes a determination as to whether the current area is an illegal peak area or not by using image data obtained by thinning lines in the auxiliary scanning direction from the inputted image data, when an image is enlarged, so that detection of the illegal peak area and determination of the copying-inhibited document can precisely be executed even when an image is enlarged.

The image processing apparatus according to the present invention has a black peak detecting means for checking whether the object pixel is a black peak or not from the object pixel data and the pixel data adjoining it for each pixel data constituting image data, and receives a result of detection by the black peak detecting means and makes a determination as to whether or not a black peak density in an area around remarked pixel data as a center coincides with a black peak density of the previously decided copying-inhibited pattern. Also, a white area is detected by receiving the image data inputted thereto, and an edge area is detected by receiving the image data inputted thereto, then determination is made as to whether or not a white area having a specified size exists within a peripheral area at a distance from the object pixel data determined as a pixel coincident to a black peak density of the copying-inhibited pattern, and whether or not remarked pixel data is a screen tone graph/a screen tone character area pixel is determined, namely, when density of a black peak in an area including object pixel is not less than a threshold value, determination is made whether or not a object pixel is a screen tone graph or a screen tone character area according to whether an edge area or a white area exists in a peripheral area including the area. Furthermore, determination is made as to whether the image data is the copying-inhibited document or not according to whether or not an object pixel coincides with a black peak density of the copying-inhibited pattern, whether or not a white area having a specified size exists within a peripheral area at a distance, and whether or not a current pixel is a screen tone graph/a screen tone character area pixel, so that a copying-inhibited document prepared by using paper with a copying-inhibited pattern previously printed or copied on the entire paper can accurately be differentiated, and copying, transfer, storage, input of image data of a copying-inhibited document can be assured prohibition thereof.

In the image processing apparatus according to the present invention, an area where a density of black peak used for a screen tone graph/a screen tone character area determining means is set to be identical to the area used for the first black peak density determining means, so that a hardware rate can be reduced.

In the image processing apparatus according to the present invention, when size of an image is changed, a pixel block size in an area determining a density of a black peak used for a screen tone graph/a screen tone character area determining means is changed in the scanner running direction, so that detection of a screen tone graph/ a screen tone character area and determination of the copying-inhibited document can precisely be executed even when size of an image is changed.

In the image processing apparatus according to the present invention, when an image is enlarged, a screen tone graph/a screen tone character area determining means makes a determination as to whether a current pixel is a screen tone graph/a screen tone character area or not by using image data obtained by thinning lines in the auxiliary scanning direction from inputted image data, so that detection of a screen tone graph/a screen tone character area and determination of the copying-inhibited document can precisely be executed even when an image is enlarged.

In the image processing apparatus according to the present invention, a screen tone character area determining means in a screen tone graph/a screen tone character area determining means makes a determination as to whether object pixel is a screen tone character area or not according to a result of detection of a density of a black peak in an area including an object pixel and an edge area detecting means, a result of whether a pixel before lines of object pixels is a screen tone character area pixel or not, and a result of whether object pixel is non-white pixel or not, so that detection of a screen tone character area and determination of the copying-inhibited document can precisely be executed.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An image processing apparatus executing a shading correction processing, a filter processing, a size changing processing, a γ-correction processing, a tone processing to inputted image data comprising:

a black peak detecting means for checking each object pixel constituting said image data and pixel data adjoining it and detecting whether said each object pixel is a black peak;

a black peak density determining means for receiving a result of detection by said black peak detecting means and making a determination as to whether a black peak density within a certain area around the object pixel as a center coincides with a prespecified black peak density for a copying-inhibited pattern;

a white area detecting means for receiving said image data inputted thereto and detecting a white area;

an edge area detecting means for receiving said image data inputted thereto and detecting an edge area;

a peripheral white area determining means for receiving a result of detection by said black peak density determining means as well as a result of detection by said white area detecting means and checking each object pixel determined as coincident to a black peak density of the copying-inhibited pattern whether a white area exists having a specified size within a peripheral areas at a distance from the object pixel;

a screen tone graph/screen tone character area determining means for receiving a result of determination by said black peak density determining means and a result of determination by said edge detecting means and making a determination as to whether the object pixel determined as a pixel coincident to a black peak density of the copying-inhibited pattern is a screen tone character area pixel;

an illegal peak area determining means for receiving a result of detection by said black peak detecting means and making determination, when either one of a black peak density within a certain area including the object pixel data and a black peak density within a certain area therearound is not less than a prespecified threshold value, as to whether a pixel within a certain area including an object pixel is an illegal peak area pixel caused by background dirt or the like;

an object pixel data determining means for making a determination as to whether each object pixel is a portion of a copying-inhibited pattern according to a result of determination by said black peak density determining means, a result or determination by said peripheral white area determining means, a result of determination by said screen tone graph/screen tone character area determining means, and a result of determination concerning an illegal peak area; and a copying-inhibited document determining means for making a determination as to whether said image data is of a copying-inhibited document according to a number of pixels determined as a portion of the copying-inhibited pattern by said object pixel data determining means.

2. An image processing apparatus according to claim 1 comprising furthermore a copying-inhibited pattern printing means for printing a copying-inhibited pattern to indicate that the document is a copying-inhibited one.

3. An image processing apparatus according to claim 2, wherein said copying-inhibited document is prepared by using paper with a copying-inhibited pattern printed on the entire surface thereof by said copying-inhibited pattern printing means or paper with a copying-inhibited pattern copied thereon and said copying-inhibited document determining means makes a determination as to whether a document is a copying-inhibited one or not.

4. An image processing apparatus according to claim 2, wherein said copying-inhibited document is prepared by using paper with a copying-inhibited pattern printed on the entire surface thereof by said copying-inhibited pattern printing means or by printing a copying-inhibited pattern on the entire surface of paper by said copying-inhibited document determining means, said copying-inhibited document determining means makes a determination whether the document is a copying-inhibited one or not, said illegal peak area determining means determines an object pixel is an illegal peak area candidate pixel when a black peak density of a first area including the object pixel is not less than a first threshold value, determines a second areas formed with a number of illegal peak area candidate pixels included therein, as an illegal peak area candidate block when a number of said illegal peak area candidate pixels present in the second area including the object pixel is not less than a second threshold value, and also determines a third areas formed with a number of illegal peak area candidate blocks included therein, including the object pixel as an illegal peak area when a number of said illegal peak area candidate blocks present in the third area is not less than a third threshold value, and said first threshold value is smaller than a threshold value used by said black peak density determining means.

5. An image processing apparatus according to claim 4, wherein a first area used for said illegal peak area determining means is the same as an area used for said black peak density determining means.

6. An image processing apparatus according to claim 4, wherein a third area used for said illegal peak area determining means is an area obtained by extending the second area used for said illegal peak area determining means in the main scanning direction.

7. An image processing apparatus according to claim 4, wherein, when size of an image is changed, said first area including an object pixel is changed in said illegal peak area determining means.

8. An image processing apparatus according to claim 4, wherein said illegal peak area determining means makes a determination as to whether a current area is an illegal peak area by using image data obtained by thinning lines when an image is expanded.

9. An image processing apparatus executing a shading correction processing, a filter processing, a size changing processing, a γ-correction processing, a tone processing to inputted image data comprising:

a black peak detecting means for checking each object pixel constituting said image data and pixel data adjoining it and detecting whether each object pixel is a black peak;

a first black peak density determining means for receiving a result of detection by said black peak detecting means and making a determination as to whether a black peak density within a certain area around the object pixel as a center coincides with a prespecified black peak density for a copying-inhibited pattern;

a white area detecting means for receiving said image data inputted thereto and detecting a white area;

an edge area detecting means for receiving said image data inputted thereto and detecting an edge area;

a peripheral white area determining means for receiving a result of detection by said first black peak density determining means as well as a result of detection by said white area detecting means and checking each object pixel determined as coincident to a black peak density of the copying-inhibited pattern whether a white area exists, having a specified size within a peripheral areas at a distance from the object pixel;

a second black peak density determining means for receiving a result of determination by said black peak detecting means inputted thereto and making a determination as to whether a black peak density of a certain area around the object pixel as a center is not less than a prespecified threshold value;

a screen tone graph/screen tone character area determining means for receiving a result of detection by said second black peak density determining means, a result of detection by said edge area detecting means, and a result of detection by said white area detecting means and making a determination as to whether each object pixel is a screen tone graph/screen tone character area pixel;

an object pixel data determining means for making a determination as to whether each object pixel is a portion of a copying-inhibited pattern according to a result of determination by said first black peak density determining means, a result of determination by said peripheral white area determining means, and a result of said screen tone graph/screen tone character area determining means; and a copying-inhibited document determining means for making a determination as to whether said image data is a copying-inhibited document or not according to a number of pixels determined as a portion of a copying-inhibited pattern by said object pixel data determining means.

10. An image processing area according to claim 9, wherein, when a size of an image is changed, an image block size in an area for determination of a black peak density used for said screen tone graph/screen tone character area determining means is changed.

11. An image processing apparatus according to claim 9, wherein said screen tone graph/screen tone character determining area makes a determination as to whether a current area is a screen tone graph/screen tone character area by using image data obtained by thinning lines when an image is expanded.

12. An image processing apparatus according to claim 9, wherein said screen tone character area determining means in said screen tone graph/screen tone character area determining means makes a determination as to whether an object pixel is a screen tone character area or not according to a result of detection of a black peak density within a certain area including the object pixel as well as to a result of detection by the edge area detecting area, a result of checking as to whether a pixel in a line just before the object pixel is a screen tone character area pixel or not, and a result of checking as to whether the object pixel is a non white area pixel or not.

13. An image processing apparatus according to claim 9, comprising furthermore a copying-inhibited pattern printing means for printing a copying-inhibited pattern to indicate that the current document is a copying-inhibited one.

14. An image processing apparatus according to claim 13, wherein said copying-inhibited document is prepared by using paper with a copying-inhibited pattern printed on the entire surface thereof by said copying-inhibited pattern printing means or paper with a copying-inhibited pattern copied thereon, and said copying-inhibited document determining means makes a determination as to whether the current document is a copying-inhibited one or not.

15. An image processing apparatus according to claim 9, wherein a threshold value in said second black peak density determining means used in said screen tone graph/screen tone character area determining means is smaller than a threshold value used for said first black peak density determining means.

16. An image processing apparatus according to claim 15, wherein said screen tone character area determining means in said screen tone graph/screen tone character area determining means makes a determination as to whether an object pixel is a screen tone character area or not according to a result of detection of a black peak density within a certain area including the object pixel as well as to a result of detection by the edge area detecting area, a result of checking as to whether a pixel in a line just before the object pixel is a screen tone character area pixel or not, and a result of checking as to whether the object pixel is a non-white area pixel or not.

17. An image processing apparatus according to claim 9, wherein a determination area in said second black peak density determining means used in said screen tone graph/screen tone character area determining means is the same as that used for said first black peak density determining area.

18. An image processing area according to claim 17, wherein, when a size of an image is changed, an image block size in an area for determination of a black peak density used for said screen tone graph/screen tone character area determining means is changed.

19. An image processing apparatus according to claim 17, wherein said screen tone graph/screen tone character determining area makes a determination as to whether a current area is a screen tone graph/screen tone character area by using image data obtained by thinning lines when an image is expanded.

20. An image processing apparatus according to claim 17, wherein said screen tone character area determining means in said screen tone graph/screen tone character area determining means makes a determination as to whether an object is a screen tone character area or not according to a result of detection of a black peak density within a certain area including the object pixel as well as to a result of detection by the edge area detecting area, a result of checking as to whether a pixel in a line just before the object pixel is a screen tone character area pixel or not, and a result of checking as to whether the object pixel is a non-white area pixel or not.

* * * * *